United States Patent
Sun et al.

(10) Patent No.: US 6,442,663 B1
(45) Date of Patent: Aug. 27, 2002

(54) DATA COLLECTION AND RESTORATION FOR HOMOGENEOUS OR HETEROGENEOUS PROCESS MIGRATION

(75) Inventors: Xian-He Sun; Kasidit Chanchio, both of Baton Rouge, LA (US)

(73) Assignee: Board of Supervisors of Louisiana University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/100,364

(22) Filed: Jun. 19, 1998

(51) Int. Cl.$^7$ ............................................. G06F 12/00
(52) U.S. Cl. ...................................... 711/202; 709/312
(58) Field of Search ............................ 709/1, 100–108, 709/212, 229, 231, 232, 310–400, 312; 707/10, 11, 6, 103, 206; 717/140–161; 711/200–221

(56) References Cited

U.S. PATENT DOCUMENTS

| | | | | |
|---|---|---|---|---|
| 4,679,137 A | * | 7/1987 | Lane et al. ................... | 700/83 |
| 5,126,932 A | | 6/1992 | Wolfson et al. ............. | 364/131 |
| 5,666,553 A | | 9/1997 | Crozier ....................... | 395/803 |
| 5,918,229 A | * | 6/1999 | Davis et al. .................. | 707/10 |
| 5,966,531 A | * | 10/1999 | Skeen et al. ................. | 709/315 |
| 6,021,274 A | * | 2/2000 | Reed et al. .................. | 709/310 |
| 6,128,621 A | * | 10/2000 | Weisz .......................... | 707/103 |
| 6,154,877 A | * | 12/2000 | Ramkumar et al. ........... | 717/11 |
| 6,192,514 B1 | * | 2/2001 | Lurndal ......................... | 717/6 |

OTHER PUBLICATIONS

Casas, J. et al., "MPVM: A Migration Transparent Version of PVM," Department of Science and Engineering, Oregon Graduate Institute of Science & Technology, pp. 1–27 (Feb. 1995).

Chanchio, K. and X.–H. Sun, "Efficient process migration for parallel processing on non—dedicated network of workstations," Tech. Rep. 96–74, NASA Langley Research Center, ICASE, pp. 1–26 (1996).

Chanchio, K. and X.–H. Sun, "MpPVM: A software system for non—dedicated heterogeneous computing," in Proceeding of 1996 International Conference on Parallel Processing, pp. 215–222 (Aug. 1996).

Chanchio, K., and X.–H. Sun, "Data collection and restoration for heterogeneous network process migration," Tech. Rep. 97–017, Louisiana State University, Department of Computer Science, pp. 1–19 (Sep. 1997).

Corbin, J., "The Art of Distributed Applications," Springer–Verlag, pp. 11–49 (1990).

Ferrari, J., S. J. Chapin, and A. S. Grimshaw, "Process Introspection: A Heterogeneous Checkpoint/Restart Mechanism Based on Automatic Code Modification," Tech. Rep. CS–97–05, University of Virginia, Department of Computer Science, pp. 1–16 (Mar. 1997).

(List continued on next page.)

Primary Examiner—St. John Courtenay, III
Assistant Examiner—Van H. Nguyen
(74) Attorney, Agent, or Firm—John H. Runnels

(57) ABSTRACT

A technique for process migration between computers is disclosed, particularly for collecting the memory contents of a process on one computer in a machine-independent information stream, and for restoring the data content from the information stream to the memory space of a new process on a different computer. The data collection and restoration method enables sophisticated data structures such as indirect memory references to be migrated appropriately between heterogeneous computer environments.

14 Claims, 16 Drawing Sheets

OTHER PUBLICATIONS

Grimshaw, S., W. A. Wulf, and the Legion team, "The Legion vision of a worldwide virtual computer," Communications ACM, vol. 40, No. 1, pp. 39–45 (1997).

Smith, P. and N. C. Hutchinson, "Heterogeneous Process Migration : The TUI system," Tech. Rep. 96–04, University of British Columbia, Department of Computer Science, pp. 1–42 (Feb. 1996, Revised Mar. 1997).

Stevens, R., P. Woodward, T. DeFanti, and C. Catlett, "From the I–WAY to the national technology grid," Communications ACM, vol. 11, No. 40, pp. 51–60 (1997).

Theimer, M. H., and B. Hayes, "Heterogeneous process migration by recompilation," in Proceeding of the 11th IEEE International Conference on Distributed Computing Systems, pp. 18–25 (Jun. 1991).

von Bank, D., C.M. Shub, and R. W. Sebesta, "A unified model of pointwise equivalence of procedural computations," ACM Transactions on Programming Languages and Systems, vol. 16, pp. 1842–1874 (Nov. 1994).

* cited by examiner

```
 1: struct tree {
 2: float d1, int d2; int *(*d3)[10];
 3: struct tree * left;
 4: struct tree * right;
 5: };
 6: struct tree * gb;
 7: main()
    {
 8:     int i;
 9:     int a, *b;
10:     struct tree *parray[10];
11:     a = 1;
12:     b = &a ;
13:     for ( i = 0; i < 10; i++ ){
14:        foo ( parray + i, &b );
15:        gb = parray[1];
        }
    }
16: foo( struct tree **p, int **q ){
17:    *p = (struct tree *)
            malloc ( sizeof( struct tree ) );
18     (*p)->d2 = **q ;
19     (**q) ++ ;
    }
```

Fig. 8(a)

DATA COLLECTION AND RESTORATION FOR HOMOGENEOUS OR HETEROGENEOUS PROCESS MIGRATION

The development of this invention was partially funded by the Government under grant number ASC-9720215 awarded by the National Science Foundation. The Government has certain rights in this invention.

This invention pertains to methods and apparatus for collecting and restoring the data contents of a process in the memory space of a computer, more particularly for data collection and restoration between computers which may or may not have the same computing platform.

Creation of a national communication infrastructure, the so-called "information superhighway," marked the beginning of a new era in computer communication. Network computing has emerged as an essential component of the infrastructure; however, current network environments do not meet rapidly increasing computational demands. Efficient process migration, i.e., transfer of a process between different computers, is one of the critical issues of a national effort to solve this problem.

In distributed network computing, adaptability of process assignment is desirable for high throughput and resource utilization, especially for a long-running application. A "process" is a piece of a program in execution. It represents a job assigned to a computer during the execution of an application. An application can comprise one or more processes running on single or multiple computers.

The software and hardware on a computer create a distinct computing platform. In the development of a user application, users provide an executable file via a compiler for that particular computer. The executable file contains a sequence of machine instructions in form of platform-specific binary code. One or more processes are created on a computer before an executable file can be executed on a computer, so that the operating system of the computer can load those instructions into the computer's main memory and assign the instructions to the central processing unit, or CPU.

In building an executable file, a user can write a program (or source code) in the form of a high-level computer language such as C, C++, or FORTRAN, and pass it to a compiler for that language. A user program comprises a global data definition area and a description of functions. Each function description comprises parameter variable declarations, local variable declarations, and programming language statements. The compiler translates the program source code into the platform-specific binary code, and stores them in an executable file. During compilation, the compiler can also optimize the machine instructions according to specific features of the computing platform. At runtime, the operating system loads the executable file into the computer's memory. The loaded executable file is then ready to be executed by the CPU and is recognized as one or more processes.

Efficient process migration, where the execution of a process is suspended on one computer and then resumed on another computer, is a mechanism to adapt process and resource assignment. "Heterogeneous" process migration occurs when a process is transferred between two machines that differ in hardware or software environments such as CPU, memory, compiler, operating system, or software tools. The process can be transferred via direct network-to-network communication (network migration) as opposed to file migration. Applications of process migration include load distribution, migrating processes from overloaded machines to underloaded machines to exploit otherwise unused computing cycles; fault resilience, migrating processes from machines that may experience partial failure; resource sharing, migrating processes to machines with special hardware or other unique resources such as databases or peripherals required for computations; data access locality, migrating processes towards the source of the data; and mobile computing, migrating processes from a host to a mobile computer.

In terms of resource sharing, processes can be migrated to computers that have resources such as databases or peripherals required for computations. In addition to clustered network computing, mobile computing and ubiquitous computing (two emerging computing disciplines) also demand efficient process migration. The advantage of process migration can be significantly scaled up when the underlying computers are heterogeneous, but the complexity of heterogeneous process migration becomes significantly scaled up as well. While software environments have been developed for homogeneous process migration, currently no solution exists for efficient heterogeneous process migration.

Fundamentally, there are three steps to make source code migratable in a heterogeneous environment:

(1) Identify the subset of language features that is migration-safe, i.e. features that theoretically can be carried across a network;

(2) Implement a methodology to transform migration-safe code into a "migratable" format so that it can be migrated at run-time; and (3) Develop mechanisms to migrate the "migratable" processes reliably and efficiently.

Three different strategies have been used for process migration: Operating System (OS) support, checkpointing, and mobile agent. The traditional OS support approach for process migration is very difficult to implement, and nearly impossible to extend to a heterogeneous environment because the operating system approach is based on the run-time image of platform-specific binary code. Checkpointing has been developed primarily for fault tolerance, by transferring and restarting the checkpointed processes on working machines. Checkpointing requires access to file systems and roll backs to a consistent global state in parallel processes. To checkpoint a process requires the additional step of saving the data contents of a process to a file periodically. Later, when recovery is needed, data from the checkpointed file will be read and restored in a new process to resume execution of the application. Checkpointing, although successful in homogeneous environments, is still difficult in heterogeneous environments because it is too slow to meet the needs of high performance network computing, especially for distributed parallel processing.

The mobile agent approach is an alternative to "true" process migration. Mobile agents are implemented on top of safe languages, such as Java. Interpreted, or safe, languages are more secure and promising for certain applications. The interpreter acts as a virtual machine to create an artificial homogeneous environment. However, these languages are less powerful, slow, and require rewrites of existing software.

In any approach to process migration, there is a need for efficient methods to recognize, collect, and restore data contents of a process. To migrate a process, all data necessary for future execution of the process has to be collected and then restored in the data segment of the new process on another machine.

There are two basic types of data objects that can be contained in the memory space of a process: the storage object and the memory reference object. The storage object (or a memory block) is a piece of memory space that is used to store a value such as a character, an integer, a floating-point number, or a memory address. The memory reference object (or a pointer, an indirect memory reference) is the memory address of a storage object. Accessing the content of a storage object via its pointer is called "dereferencing".

FIG. 1 shows examples of storage objects and reference objects. A storage object comprises a memory address and a memory storage space. In FIG. 1, the storage object at memory address 3010 contains an integer value, 10. Likewise, the storage objects at addresses 2001 and 1120 contain a floating-point value, 9.99999, and a character, 'A', respectively.

A memory reference object is a memory address of a storage object. A memory reference object is also called a pointer. A pointer can be used to access a storage object and its contents. For instance, the pointer value 2001 is a reference to the storage object containing the value 9.99999. Dereferencing the pointer 2001 gives a floating-point value, 9.99999, as a result. At the address 0109, the storage object contain a memory address 1120 as its value. The pointer 1120 is a reference to the storage object at memory address 1120.

Due to differences in hardware and software in a heterogeneous environment, the detailed representation of a data object within a process on different platforms could be different in two aspects:

[1] Data Representation: Each platform has a machine-specific data representation. For example, machines with processors such as System/370 and SPARC use "big-endian" byte ordering, while others with processors such as VAX and Intel 8086 use "little-endian" byte ordering. Floating-point representations also differ on various platforms.

[2] Memory Address: Due to different OS memory management and loading operations, a memory address used in a process on one computer may be meaningless to a process on a different computer. When the executable file is loaded into the computer's main memory, its contents are placed at particular memory locations, depending on the memory management scheme used by the operating system of that computer. Therefore, while a memory address in one process could refer to a particular data object, the same memory address could be undefined or refer to something else when used by a process on another machine.

Since the data content of a process can contain complex data structures that are combinations of both storage objects and pointers, a mechanism to collect the data content of a process must recognize different data objects as well as their structures. Further, the data content must be transferred into a specific machine-independent format. To restore the data content to the memory space on a different machine, the restoration mechanism must be able to extract the collected information and reconstruct the data structure into the memory space.

Until now, there has been no satisfactory solution to the problem of data collection and restoration because: 1) processes have to restart under different hardware and software environments, defined as "heterogeneity"; 2) only necessary data should be transferred over the network to reduce migration cost to a tolerable level, defined as "efficiency"; and 3) complex data structures such as pointers and recursive calls have to be analyzed and handled appropriately to support general high-level languages, such as C and Fortran, defined as "complexity."

As a national effort, several prototype next generation distributed environments are under development. See S. Grimshaw, W. A. Wulf, and the Legion team, "The Legion vision of a worldwide virtual computer," *Communications ACM*, vol. 40, no. 1, pp. 39–45, 1997; R. Stevens, P. Woodward, T. DeFanti, and C. Catlett, "From the I-WAY to the national technology grid," *Communications ACM*, vol. 11, no. 40, pp. 51–60, 1997. These systems are designed to build a world wide virtual machine environment on top of the huge number of computers available on a network. Network process migration is one of the critical issues to the success of these systems.

Due to their complexity, early works on heterogeneous network process migration concentrated on theoretical foundations. See M. H. Theimer and B. Hayes, "Heterogeneous process migration by recompilation," *Proceeding of the 11th IEEE International Conference on Distributed Computing Systems*, pp. 18–25, June 1991; and von Bank, Shub, and Sebesta, "A unified model of pointwise equivalence of procedural computations," *ACM Transactions on Programming Languages and Systems*, vol. 16, November 1994. No prototype design or experimental implementation was provided.

Theimer et al. approached heterogeneous process migration by 1) dynamically constructing a machine-independent program of the state of the computation at migration time, 2) compiling the program on the destination machine, and 3) running the program on the destination machine to recreate the migrated process. The transformation uses "native code," intermediate language such as that used by compiler front end and backend code generators, to simplify process state specification. The migration overhead costs are increased by the recompilation requirement. The report specifically does not provide a solution for high level languages where, for example, code explosion may occur. The principles of source-level debugging are used to reverse-compile the machine-dependent binary program state to a machine-independent source program description, with the data traced in a "garbage collector" fashion using a source-level debugger procedural interface. The theory proposes modified versions of the procedure on the stack to recreate the stack data and then resume execution of the original procedure.

Von Bank et al. proposed a modified compiler to generate code for all expected machines along with sets of native code, initialized data, and correspondence information embedded in the executable file at program translation time rather than dynamic generation during migration to minimize migration time. A procedural computation model defines the points where transformation is practical, by defining equivalence parameters for two well-defined compatible states where the process can be transformed without loss of information, but does not propose how this transformation is accomplished. Determining the compatible well-defined state of computation in the address space of the process is composed of 1) the function call graph, 2) the values of variables in the static data, 3) a dynamic data pool and 3) the activation data pool, which provides points of equivalence for migration. The report proposes only a theoretical migration model that includes a function call graph in which the vertices are functions and the edges of the graph are function calls, defined as any subroutine. A function call graph vertex contains a flow graph for the function and a local data template to activate the function. The function call graph edge contains a parameter data template and a dynamic data template describing the type of dynamic data to be allocated. The reference does not propose how to collect the data from the memory space.

Casas, et al., "MPVM: A Migration Transparent Version of PVM," Department of Science and Engineering, Oregon Graduate Institute of Science & Technology, February 1995, reports a technique for migrating processes in a parallel distributed environment. However, the method is not heterogeneous, requiring the same machines (hardware) to support the migration. The data, stack and heap segments of the execution code are transferred to the other machine, requiring binary compatibility.

K. Chanchio and X.-H. Sun, "MpPVM: A software system for non-dedicated heterogeneous computing," *Proceeding of* 1996 *International Conference on Parallel Processing*, August 1996, and K. Chanchio and X.-H. Sun, "Efficient process migration for parallel processing on non-dedicated network of workstations," Tech. Rep. 96–74, NASA Langley Research Center, ICASE, 1996, describe certain procedures and data structures for transforming a high-level program into a migratable format via a precompiler to avoid compiler modification. A set of migration points is inserted at various locations in the source programs based on migration point analysis. A migration point is a point of execution that allows a process to migrate to a new host. The migration-point concept is based on the checkpointing approach for efficient process migration. Unlike checkpointing, in the migration-point approach the program state does not need to be stored periodically. Upon migration, the migrating process continues execution until the first migration point is met. The process is migrated via direct network-to-network communication. Special variables and macros are inserted at migration points and related locations in the program to control transfer of the program execution state as well as data from a migrating process to a new process on the destination machine. The cooperation of the macros that manage data collection, transmission, and restoration is called the data transfer mechanism. The data stack stores all necessary local and global data at the point where migration occurs. In the stack data transfer (SDT) mechanism, live data of the executing function is collected first, and that of the caller function is collected later. Upon restoration, the SDT restores live data of those functions in reverse order. The SDT mechanism precludes overlapping during data collection and restoration. "Necessary data analysis" is proposed as a methodology to reduce the size of data that must be transferred during the migration. "Pre-initialization" is also proposed to send modified source code to all machines anticipated to be destination machines and compiled on those target machines, preferably before migration needed to reduce migration overhead. No general and efficient method for data collection was given.

The effort to transmit data among processes in a heterogeneous environment is not new. Well-known software packages such as Sun's XDR have been used to support data transmission among computers with different data representations. See J. Corbin, *The Art of Distributed Applications*, Springer-Verlag, 1990. The XDR software package consists of XDR data representation, standard definitions of data in machine-independent format, and an XDR library that provides routines to encode data stored in the native format of a machine to the XDR format, and to decode data in the XDR format to the native one. The XDR software package does not provide a mechanism for data collection and restoration in process migration.

Recent works in data collection and restoration mechanisms for process migration have addressed two major directions: the employment of specially modified debugging utilities and the annotation of special operations to the source code. In the first direction, Smith and Hutchinson have investigated the migration features of high-level languages such as C, and have developed a prototype process migration system called TUI. See P. Smith and N. C. Hutchinson, "Heterogeneous Process Migration: The TUI system," Tech. Rep. 96–04, University of British Columbia, Department of Computer Science, February 1996, Revised on March 1997. Smith and Hutchinson identified the migration-unsafe features of the C language and used a compiler to detect and avoid most of the migration-unsafe features. In their design, process migration is controlled by the external agents, migrout and migin, for data collection and restoration, respectively. The TUI system features a compiler-generated state mapping information in a symbol table similar to those typically used in symbolic debuggers. The external agents require special programs to capture and restore the state of the running process. The steps to migrate include 1) compiling the program once for each architecture using a modified compiler; 2) checkpointing the process using migrout to fetch memory and data values; and 3) creating an intermediate form. The data type is known by compiling with the modified compiler. Debugging information is used to scan and locate data to copy into TUI's address space using a "garbage collector" technique. A value table is maintained to collect the data only once, with the memory scanned in linear fashion. Each entry in the value table is assigned a unique number with pointers recorded in the table until data values are set on the destination machine. Subsequent prototypes of TUI imposed increasing/decreasing order to scan addresses, a restriction that may cause problems for new architectures. Smith and Hutchinson's work has several design aspects consistent with von Bank's foundation for viewing data elements in program memory space from the perspective of available debugging technology. The compiler must be modified to provide debugging information and to insert preemption points and call points into the executable code for capturing and restoring process states. The need to modify the front-end and back-end of the compiler may limit portability to various computer platforms, since the compiler must be modified for each architecture in the environment. Also, a modified compiler may not be able to fully exploit the machine-specific optimization of a native compiler.

The second direction uses the "program annotation" technique to support process migration. The Process Introspection (PI) approach proposed by Ferrari, Chapin, and Grimshaw uses this technique. See J. Ferrari, S. J. Chapin, and A. S. Grimshaw, "Process Introspection: A Heterogeneous Checkpoint/Restart Mechanism Based on Automatic Code Modification," Tech. Rep. CS-97-05, University of Virginia, Department of Computer Science, March 1997. The PI approach has some similarities to MpPVM migration point analysis approach. Process introspection implements a prototype of library routines (PIL library) to support the design. The process state is captured in a data only format that must be used in conjunction with a separate executable file. Points representing checkpointing locations are inserted in the source code before compilation. Experiments were conducted on a number of array-based numerical kernels. To collect data, the Pi approach uses native subroutines to save stack data to checkpoint the stack. The active subroutine saves its own data (which only it can access), then returns to its caller, which in turn saves its own stack, and so on, until the stack capture is complete, and reverses the procedure to restore the data. An added subroutine outputs dynamically allocated stack elements to a table in the PIL library. The "Type" table in the PIL library contains descriptions of basic data types stored in the memory block, and maps type identifiers to logical type descriptions as a linear vector of some number of elements of a type described by an entry in the type table. However, the PI approach does not define the logical type description or how they are used to collect and restore data. The "Data Format Conversion" module in the PIL masks differences in byte ordering and floating point representation and contains routines to translate basic data types to and from available formats. The "Pointer Analysis" module generates logical descriptions of memory locations with a unique identification number and an offset into the memory block. The methodology does not provide how the number is assigned or the ordering used to assign the numbers, or how the offset is defined in a heterogeneous environment, or how to handle a situation in which multiple pointers reference a single object.

U.S. Pat. No. 5,666,553 discloses a method for translation of dissimilarly-formatted data between disparate computer systems and provides for dynamic reconciliation of conflicts in the data based on content and by the user. The disclosure is directed toward creating a common data format between desktop and handheld computer database applications to identify and resolve conflicts between the applications and update them.

U.S. Pat. No. 5,126,932 discloses a method to execute a program consisting of data and multiple successive operations on the data in a heterogeneous multiple computer system with autonomous nodes that each have a processor and associated memory. A control arrangement initiates execution of the program on the first autonomous node while a coupling arrangement transfers execution of the program to a second autonomous node in the multiple computer system in response to successive operations in the program.

We have discovered a technique for collecting memory contents of a process on one computer into a machine-independent information stream, and for restoring the data content from the information stream to the memory space of a new process on a different computer. The mechanisms and associated algorithms of data collection and restoration enable sophisticated data structures such as pointers to be migrated appropriately in a heterogeneous environment. These mechanisms analyze the pre-stored or current program state for heterogeneous process migration and can be used in both checkpointing and migration-point process migration, as well as in sequential and parallel distributed computing. These mechanisms may be used in any general solution to network process migration to carry out the following tasks automatically and effectively:

(1) Recognize the complex data structures of a migrating process for heterogeneous process migration;
(2) Encode the data structures into a machine-independent format;
(3) Transmit the encoded information stream to a new process on the destination machine; and
(4) Decode the transmitted information stream and rebuild the data structures in the memory space of the new procession the destination machine.

While the prototype algorithms and software to date have been written in C code, the mechanisms are general and may be used to support applications written in any stack-based programming languages with pointers and dynamic data structures, for example, C++, Pascal, Fortran, and Ada. A prototype run-time library has been developed to support process migration of migration-safe C code in a heterogeneous environment.

The run-time library developed by the inventors has been successfully tested under the buffer data transfer ("BDT") mechanism for heterogeneous network process migration. The BDT mechanism implements data collection and restoration mechanisms differently from stack data transfer ("SDT") by allowing data collection and restoration operations to be overlapped to increase efficiency. The BDT mechanism manages data collection and restoration through the following steps:

(1) When migration is initiated, the BDT sends information about the execution state of the migrating process to a new process on the destination machine. The new process creates a sequence of function calls identical to those in the migrating process to jump to the point where migration initiated.
(2) After sending the information, the migrating process collects and saves the necessary data of the innermost function in the calling sequence to a buffer and returns to its caller function. The same operation continues until the main function is reached. Before terminating the migrating process, the BDT sends the stream of information stored in the buffer to the new process.
(3) At the destination machine, the new process reads and restores the live data from the information stream. The BDT mechanism restores the live data of the function called until the end of its execution. After the function returns to its caller, the BDT again reads the content of the information stream to restore live data of the caller function, and continues to control the order of the data restoration through this process until the main function is reached.

The BDT mechanism improves performance by allowing simultaneous saving and restoring operations: the new process restores its memory space while the migrating process saves the next portion of data from its memory space. The algorithms and the run-time library of the present invention are, however, independent of the Buffer Data Transfer mechanism. They can be used under any process migration environment which provides an appropriate interface.

We have used an annotation technique in a novel data collection and restoration technique that views data elements of a program from the viewpoint of abstracted programming. Codes annotated to the source program systematically track program data structures in the form of a graph. Mapping graph notations to represent data structures of the process gives high-level representation of the relationship among data elements. The graph model is very useful because it can be analyzed and manipulated in many ways. A rich literature of graph theory and algorithms are available. The graph representation makes the novel approach error-free and efficient. The data collection and restoration methods may be used for both migration-point and checkpoint-based heterogeneous process migration. The novel technique is designed specifically for heterogeneous process migration, and is considerably faster and more effective than the debugger-based approach.

A preferred embodiment comprises four modules: a Type Information (TI) table, saving and restoring functions, the Memory Space Representation Look Up Table (MSRLT) data structures and programming interfaces, and the data collection and restoration algorithms and their programming interfaces. These modules, illustrated schematically in FIG. 2, are attached to the source process and destination process for data transmission. On the source computer, these modules work together to collect data from the memory space of the source process, and to put data into a machine-independent information stream output. On the destination computer, software modules attached to the destination process extract data from the machine-independent information stream, and place data in appropriate locations in the memory space of the destination process.

A key feature of the invention is a model that represents the process' memory space. The Memory Space Representation (MSR) model gives a high-level, platform-independent viewpoint of data contents in the memory space of a process.

The data contents of a process are a snapshot of the process memory space. In the MSR model, the memory snapshot may be viewed logically as a graph in which each node of the graph represents a memory block allocated for storing data during program execution (or a storage object), and each edge of the graph represents a pointer that references an allocated memory block (an MSR node) to any other memory blocks, including itself.

For example, FIG. 3 shows the contents of a memory snapshot of a process. The memory blocks at addresses 0007 and 0020 contains integer values 10 and 20, respectively. The other memory blocks in FIG. 3 are combinations of an integer value and two pointers. For instance, the memory block at address 0101 contains an integer 30, and pointers 0207 and 2026. The first pointer, 0207, refers to another memory block containing the integer value 40, and pointers 0899 and 2026. The memory blocks at addresses 0899 and 2026 are the same type of memory blocks as those at addresses 0101 and 0207, but their pointer components are NULL.

In the MSR model, the memory snapshot in FIG. 3 can be represented by the MSR graph in FIG. 4. In the MSR graph, a node is the representation of a memory block in the memory snapshot of a process. For example, nodes V1 and V3 represent the memory blocks at addresses 0007 and 0101, respectively. At node V3, the pointer components create two MSR edges, E1 and E2.

In an MSR graph, an edge is a direct link between two nodes. The source of the link is a component of a memory block that stores a pointer, and the destination of the link is the component of a memory block to which the pointer refers. An edge can also be defined as the pair of addresses of its source and destination components.

The head address of a memory block is the starting address of the memory block. The head address can be used to designate the memory block since it is a unique property. Further, a memory block can comprise multiple objects. Each object is considered a component of the memory block. A component address is the memory address at the starting address of a component. To say that a memory address x is the address of an MSR node y means that the address x is one of the component addresses of the memory block represented by node y.

Further, the length of a memory block is the capacity (in bytes) of the contiguous memory space allocated for storing data. Suppose that it takes 4 bytes to store an integer and 4 bytes to store a pointer. The lengths of nodes V1 and V3 are then 4 and 12 bytes, respectively. The number of elements of an MSR node is the number of data objects contained in the memory block. For example, the number of elements in each of nodes V1 and V3 is one, since each contains a single data object of type integer and TREE, respectively.

For example, if the size of an integer value and the size of a pointer are each 4 bytes, the component addresses of the node V3 are 0101, 0105, and 0109. The component address 0101 is the memory address of the first component of V3, which stores the integer value 30. The second component address 0105 (0101+4) is the memory address of the second component of V3, which stores a pointer to the memory block at address 0207. Finally, the address 0109 (0105+4) is the component address of the last component of V3, which contains a pointer to address 2026.

Table 1 lists information defining the MSR edge in FIG. 3. For example, edge E1 can be defined as (0105, 0207) where address 0105 is the address of the second component of the source node V3, and the address 0207 is the address of the first component of the destination node V4.

TABLE 1

| EDGE | Source Node | Destination Node | Source Address | Destination Address |
| --- | --- | --- | --- | --- |
| E1 | V3 | V4 | 0105 | 0207 |
| E2 | V3 | V5 | 0109 | 2026 |
| E3 | V4 | V5 | 0215 | 2026 |
| E4 | V4 | V6 | 0211 | 0899 |

The Type information (TI) table is created to track properties of each data type used in the process. The data type is the basic property that describes the semantic meaning of the object stored in a memory block. The type of a memory block is determined by the type of its contents (or data). A memory block contains an object or an array of objects of a particular type. The data type could be a "primitive" data type such as integer, character, or floating-point. It could also be a complex data type such as an array, and structure, record, pointer, or combination of these different types.

The array type is an abstraction of data in which a memory block contains multiple data of the same type. The structure type describes the data when a memory block contains data of different types. The pointer type is the type of a memory block that stores indirect memory references to memory blocks, perhaps including itself. In most of the high-level programming languages such as C, a name can be given to a data type. This name can be used to reference a type of a user-defined object.

For example, suppose that TREE is defined by a user as a type of a memory block containing an integer and two pointers to memory blocks of type TREE. In FIG. 4, the type of nodes V1 and V2 is integer; while those of nodes V3, V4, V5, and V6 are TREE.

The TI table is used to store information about every data type, as well as basic functions for data collection and restoration. Other parts of the TI table are the type-specific saving and restoring functions. The saving and restoring functions collect the contents of a memory block node in the MSR graph, and restore the collected information back to a memory block node, respectively. To collect the content of a graph node, which is a memory block, the basic saving function associated with the type of the memory block is invoked. The saving function then generates the machine-independent information of a memory block; the restoring function takes the machine-independent representation of the information and restores it in a machine-specific form to the appropriate memory location. To collect a graph edge, which is a pointer, the algorithm translates the machine-specific pointer address to machine-independent pointer information.

The MSR Look up Table (MSRLT) data structures are constructed to provide machine-independent locations of memory blocks and a mechanism to access them. The machine-independent locations of memory blocks are the indices of the MSRLT data structure to access those memory blocks. Since there could be a large number of memory blocks allocated in the process memory space, a method is provided to select the memory blocks that need to be registered into the MSRLT data structures. This selection keeps the size of the MSRLT data structures small, and reduces the searching time when the MSRLT is used.

According to yet another feature of the invention, algorithms to collect and restore the live data content of the process are provided. Since the data content of the process may be represented in the form of an MSR graph, the data collection algorithm may traverse and collect graph components (nodes and edges) in a depth-first manner, that is, it travels from the "leaves" back up to the "root" of the graph.

When a depth-first search algorithm is used to collect graph components, it is assumed that an initial set of nodes to be collected is known, based on live variable analysis or other criteria. For example, in FIG. 5, the nodes V3 and V4 are the initial set. This set of nodes should be known by both the sender and receiver processes before the data collection and restoration mechanisms begin. Since the receiver process does not initially know anything about the MSR nodes of the sender process, the information about the MSR nodes of the sender process must be received by the receiver process before data restoration begins.

Assuming that the receiver process knows the information of the MSR graph and the initial set of nodes V3 and V4, FIG. 5 shows an example of the output of data collection on nodes V3 and V4. In collecting V3, recall that V3 has a structure type which is a combination of an integer value and two pointers. First the integer value of V3, which is 30, is collected and saved into the information stream in a machine-independent format. V3 is also "marked" as having been "visited" by the data collection algorithms. Then when the algorithm encounters the first pointer of V3, the information of the edge E1 is collected. The depth-first algorithm follows the pointer E1 to collect the content of V4, and marks V4 as having been visited. The integer part of V4 is saved to the machine-independent stream. Then its first pointer, E4, is collected. By following E4, the data collection algorithm next visits the node V6. The information of node V6, including an integer value and two pointers, is saved and marked as visited.

Since there is no other link from V6, the algorithm backtracks to V4, and saves the second pointer of V4, which is E3. By following the link E3, V5 is visited and saved. Since there are no pointers contained in V5, the data collection algorithm backtracks to V4. Since there is no more information to be saved on V4, the algorithm backtracks to V3.

At V3, the second pointer, E2, is saved. By following E2, the node V5 would be saved. But V5 has already been visited. Thus, its data is not collected again. The algorithm instead records information saying that V5, which is the destination node of E2, has been saved (or marked). The data collection algorithm backtracks to the node V3. Since there is nothing left to be saved at V3, the data collection operation on V3 is finished. In collecting data of node V4, since its data was already collected in the previous data collection operation, node V4 will not be saved again. The algorithm instead saves information (V4(MARKED)), indicating that V4 was already saved to the information stream.

The information to reconstruct the MSRLT data structure and the collected machine-independent information of the memory space contents are placed into the output information stream and sent to another process on the destination computer. During data transmission between two processes on different machines, the information about the structure of the MSRLT data structures is sent to the destination process first, before any other machine-independent information. An identical MSRLT data structure is then created from the transmitted information in the memory space of the destination process to provide an index for restoring the data.

At the receiving end, the destination process reads the transmitted data and reconstructs its MSRLT data structure. Then the data restoration algorithm is invoked to extract data from the information stream, and to restore the data to the appropriate memory location in the destination process's memory space. The data will also be transformed from the machine-independent format to the machine-specific one according to their data types.

For example, on the receiver process, the data restoration operation restores information of V3 and V4 to its memory space. The data of V3 is extracted from the information stream to a memory space allocated for V3. Then the information of E1 and V4 are extracted from the information stream. The information of V4 is put to an allocated memory space. E1 is also recreated as a pointer from the second component of V3 to the first component of V4.

Next the restoration algorithm extracts data of E4 and V6 from the information stream. The data of the node V6 is put in an allocated memory space. The edge E4, which is a pointer from the second component of V4 to the first component of V6, is also reestablished. Since V6 does not have any pointers, the algorithm backtracks to reconstruct the second pointer of V4, which is E3.

Then the algorithm extracts E3 and V5 from the transmitted information stream. The data content of V5 is put to an allocated memory space. The pointer represented by an edge E3 is reestablished from V4 to V5. Since the pointer contents of V5 are NULL, the restoration algorithm backtracks to restore the rest of the content of the node V4. But since all components of V4 have been restored, the algorithm backtracks to restore the second component of node V3.

At this point, the data restoration algorithm extracts information of E2, and the marking flag indicating that V5 has already been visited (V5(MARKED)) from the information stream. By reading the marking flag, the algorithm knows that data content of V5 is already restored. So the algorithm finds the node V5 in the memory space of the receiver process and reconstructs the edge E2, the pointer from the third component of V3 to the first component of V5. Now the data content of the node V3 is completely restored.

Next the algorithm restores V4. Since the information of V4, V4(MARKED), in the transmitted information stream indicates that V4 is already restored, the algorithm finds the node V4 already in the memory space of the receiver process.

The invention has been successfully demonstrated with three C programs containing different data structures and execution behaviors including numerical-intensive and pointer-intensive behaviors with recursion.

BRIEF DESCRIPTION OF THE DRAWINGS

FIGS. 8a and 8b show an example program and its memory blocks.

FIG. 6 illustrates schematically the novel process for data transmission between two processes on different computing platforms. In preparing a process for data transmission in a heterogeneous environment, type information for all transmitted data is attached to the source code, the data collection and restoration library is also linked to the source code, and a special data structure is used to identify the logical locations of data in the process during execution. The type information and the library are linked with the source code at compile-time. A special data structure to track data in the process memory space, the MSRLT data structure, is dynamically constructed and maintained at run-time.

For process migration, the same source code (in migratable format) preferably is distributed to the source and destination machines before the migration decision is made, and the source code on the destination machine is compiled and ready for execution, which is defined as pre-initialization. Since the same source code is used on both the source and destination machines, identical annotated information about data types, the Type Information Table, is attached to the source code on both machines. Also, the data collection and restoration library routines that are linked with both processes during compilation should perform the same functions.

Figure 1:
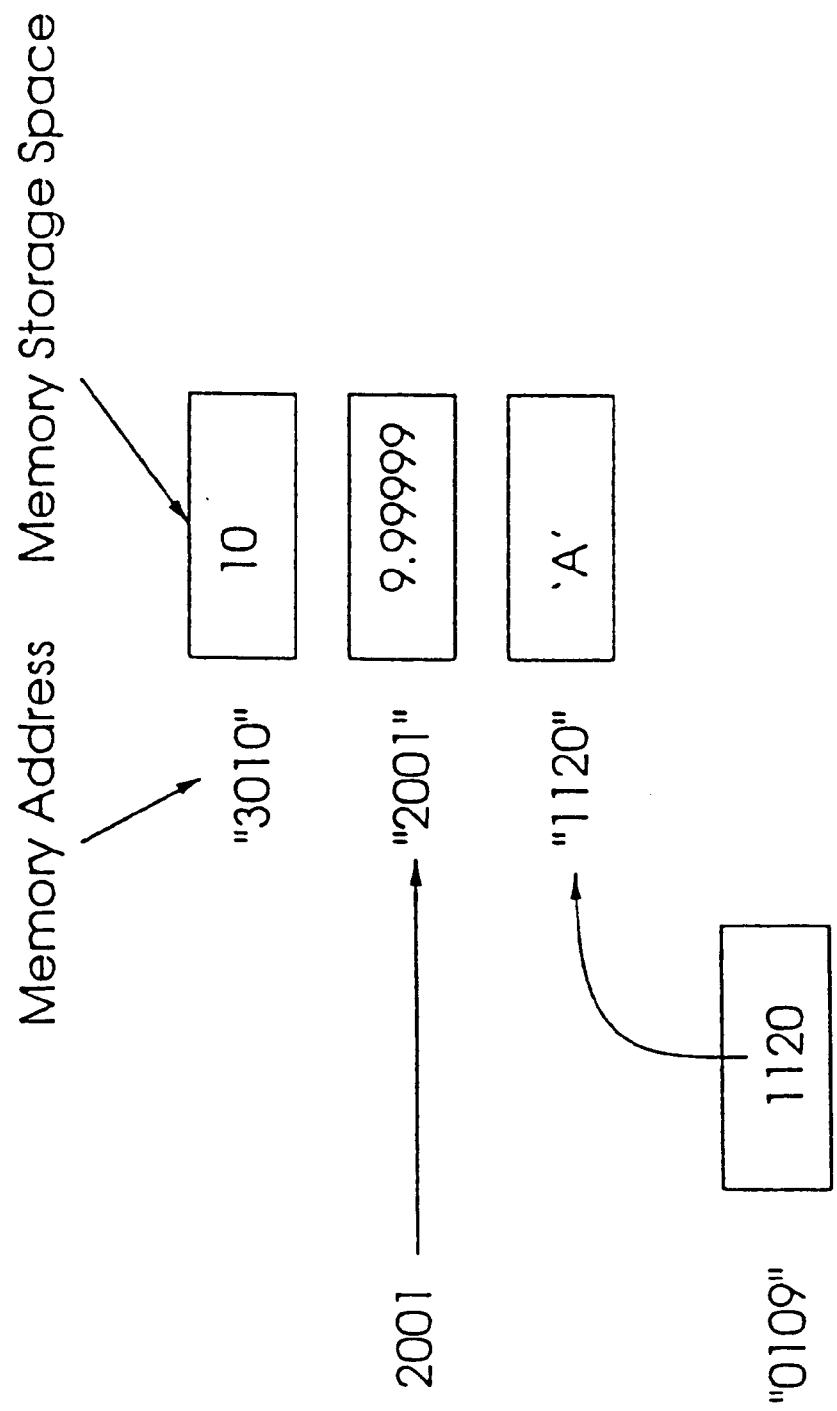
FIG. 1 shows examples of storage objects and reference objects.
Figure 2:
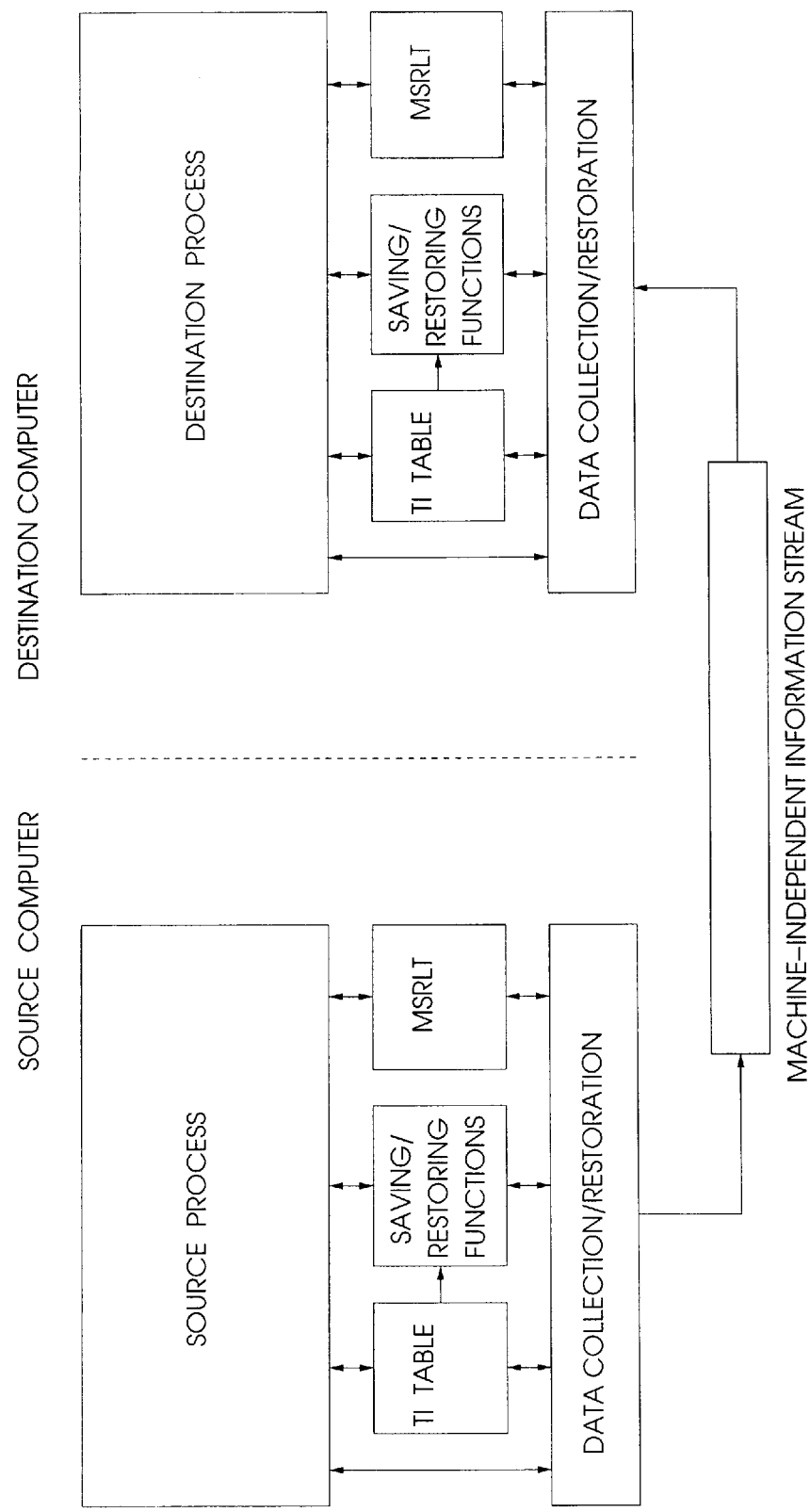
FIG. 2 shows the software modules as attached to the source and destination processes.
Figure 3:
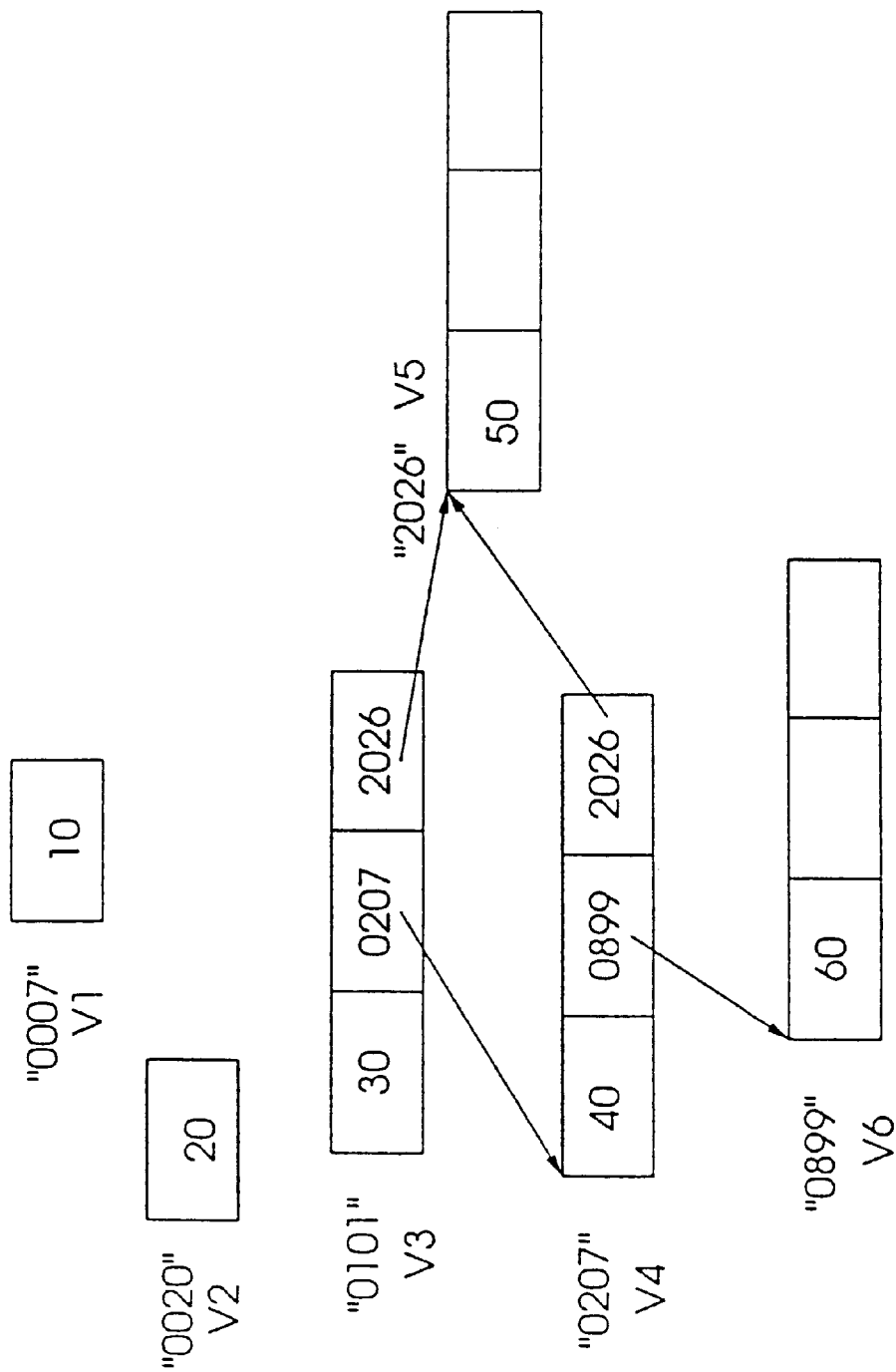
FIG. 3 shows the content of a memory snapshot of a process.
Figure 4:
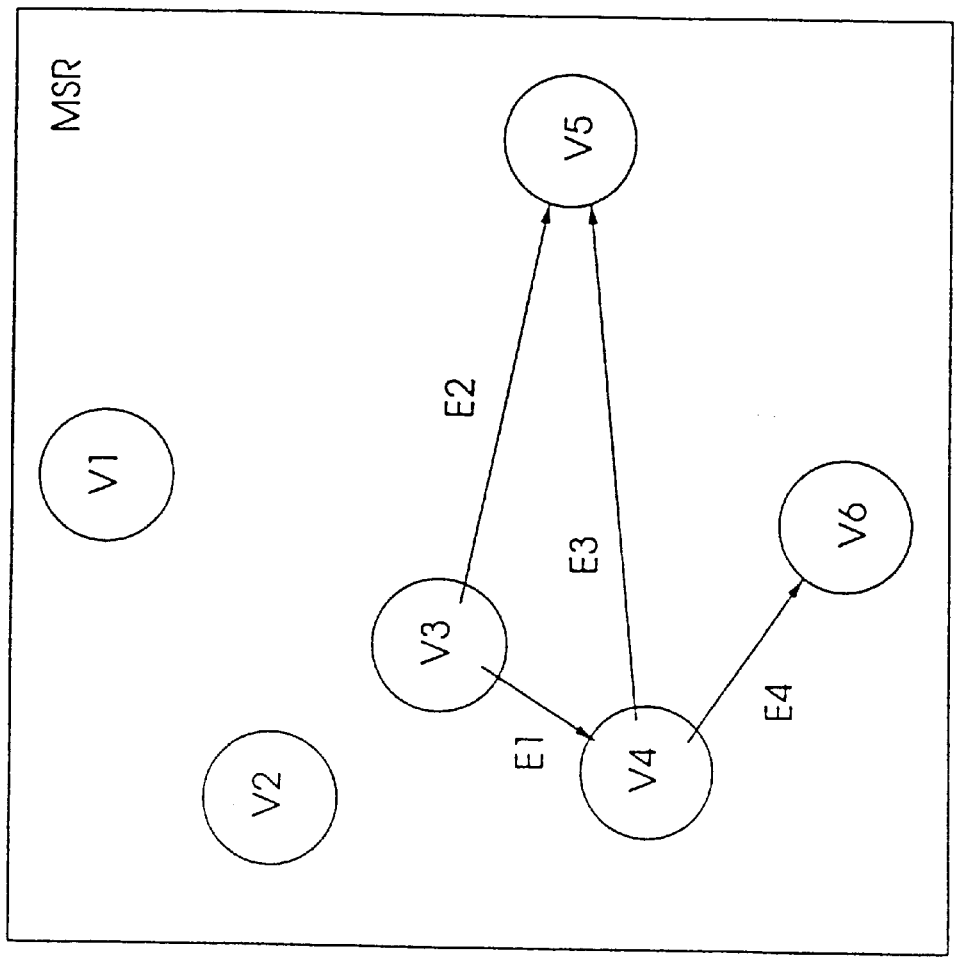
FIG. 4 shows the nodes and edges of an MSR graph.
Figure 5:
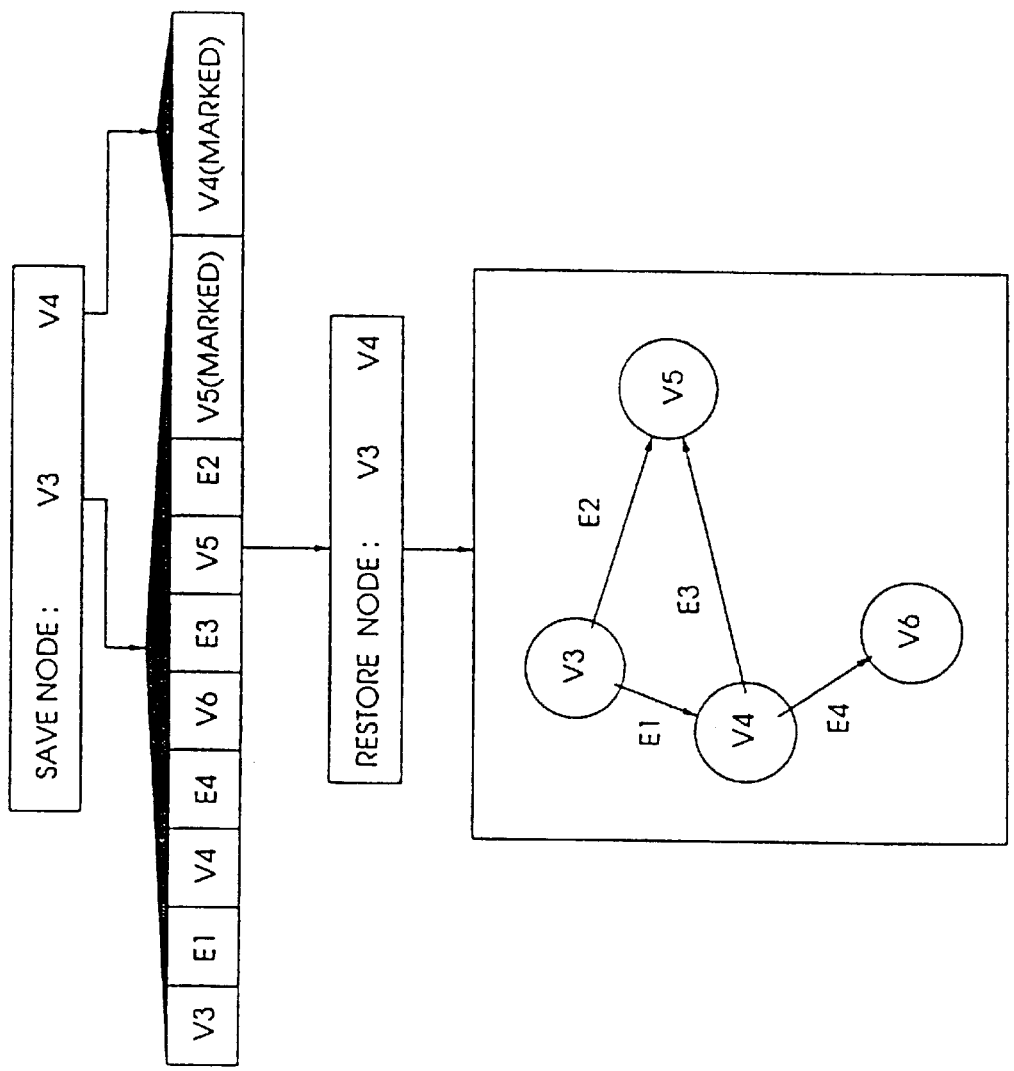
FIG. 5 shows the initial set of nodes V3 and V4.
Figure 6:
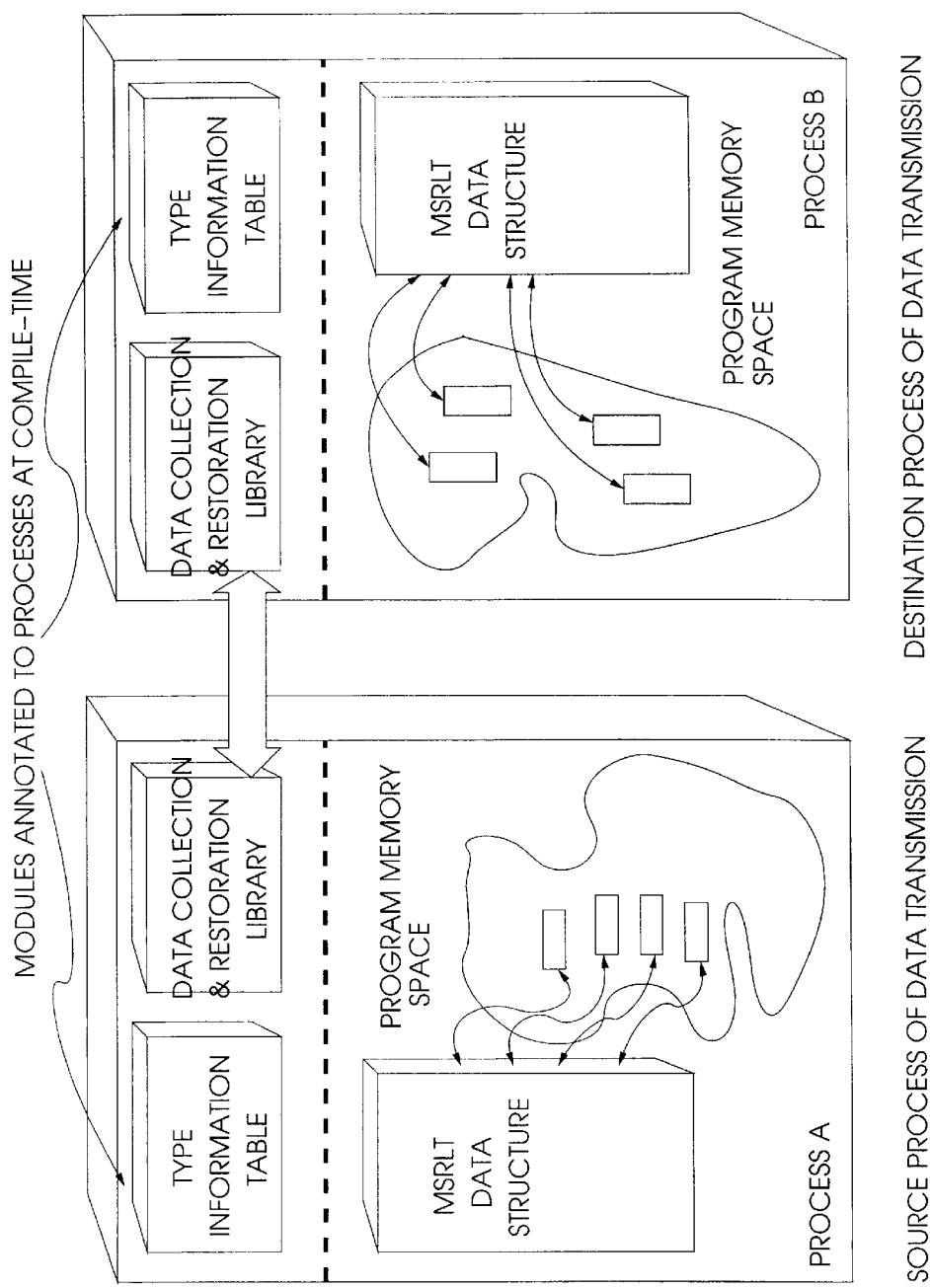
FIG. 6 shows a process model for data transfer in a heterogeneous environment.

During computation, the source process of data transmission, Process A in FIG. 6, generates and maintains a special purpose data structures, the Memory Space Representation Look Up Table (MSRLT), to track allocated memory blocks in the process memory space. It also provides logical machine-independent locations to the memory blocks. The MSRLT box not only contains information about the memory blocks such as types and lengths, but also information about the execution status of the running process. The construction of the MSRLT data structure is conducted via function calls to MSRLT Programming Interfaces inserted at various locations in the source code. The insertions of these operations are preferably performed by a precompiler.

Before data transfer, the same MSRLT data structure is created in the memory space of the destination process, Process B in FIG. 6. The new MSRLT data structure in Process B provides basic information for recognition of the logical machine-independent locations, as well as other information attached to the transmitted data during the data restoration operation. The MSRLT data structure is reconstructed by again making function calls to the MSRLT Programming Interfaces. The MSRLT is used for data collection and restoration after the MSRLT data structures are created in the memory spaces of the source and destination machines.

Figure 7:
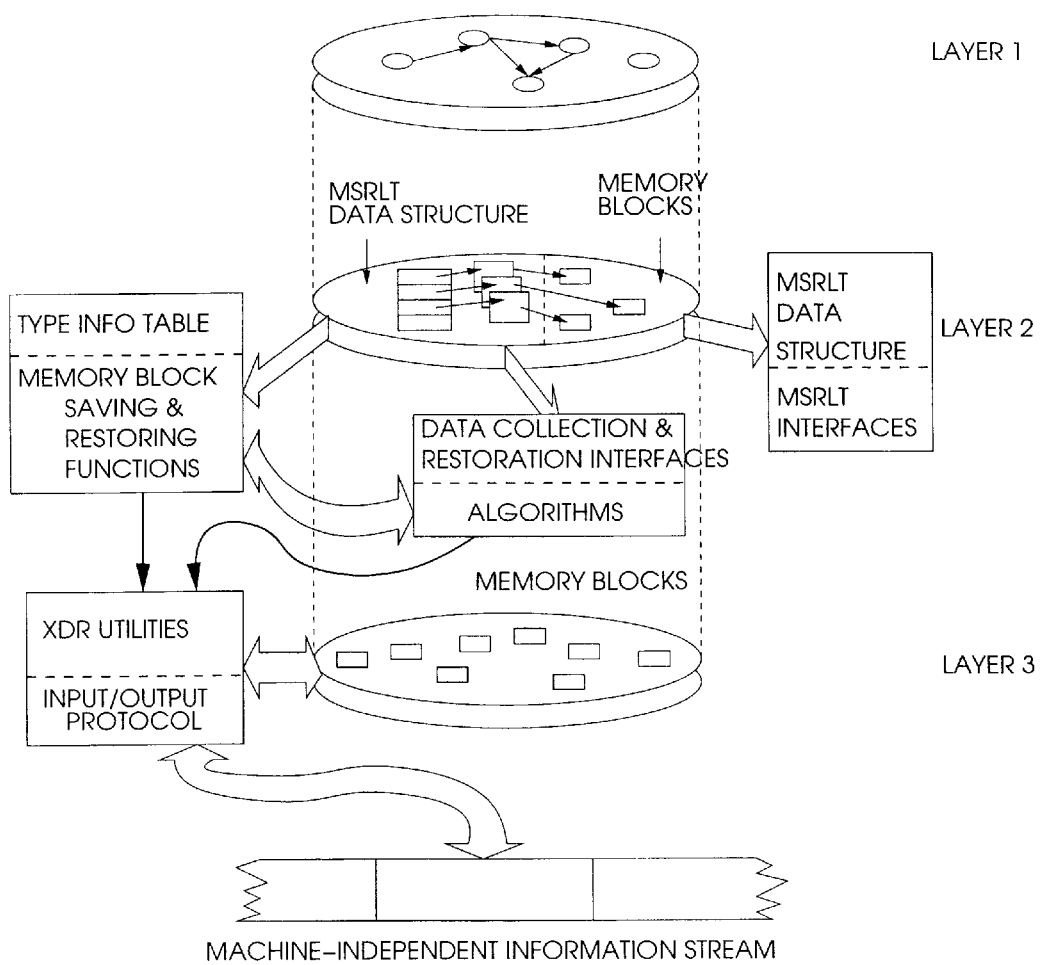
FIG. 7 shows the, layered design of the data collection and restoration software.

The data collection and restoration software may be viewed at three levels as shown in FIG. 7. The first level is the conceptual level. In this level, the memory space of a process is viewed in the form of a graph called the Memory Space Representation (MSR) graph. The data collection operation traverses the MSR graph to collect information and place the data in a stream of machine-independent information. In the data restoration operation, the software transforms the data in the machine-independent information stream to a machine-dependent form in the memory space of the destination process according to the MSR graph.

In the second level, the MSRLT data structure is used to recognize memory blocks in the form of the graph structure conceptually defined in the first level. The MSRLT data structure is designed to store memory blocks, to provide machine-independent identification of the memory blocks, and to support the searching of memory blocks during data collection and restoration operations. The MSRLT interfaces are also defined at this level to manipulate the construction and reconstruction of the MSRLT data during execution of source and destination processes, respectively.

The Type Information table is a module containing information about the data types used in the program, including (for example) XDR functions to encode the data objects of these types in machine-independent format, and to decode the machine-independent information to machine-specific format. The software runs on the top of the XDR technology. The basic idea is that the logical locations attached to the collected data enable the data to be restored to the desired locations in the memory space of the destination process. The Type Information table and the data collection and restoration modules cooperate during memory space collection and restoration.

The data collection and restoration programming interfaces and algorithms are part of a separate programming module in the second level. The function calls of the programming interfaces to save or restore variables are inserted in the source code by the precompiler. The data collection and restoration algorithms for these interfaces examine the MSRLT data structure and then call the saving or restoring function provided in the Type Information Table to encode or decode data.

Finally, the XDR utilities (for example), placed in the lowest level, are invoked after the information to be transmitted has been identified from programming modules in the second level. In the destination process, the XDR utilities decode the transmitted data from the machine-independent format to machine-dependent format.

A snapshot of the program memory space may be modeled as a graph G, defined by G=(V, E), where V and E are the set of vertices and edges respectively. G is called the Memory Space Representation (MSR) graph. Each vertex in the graph represents a memory block, and each edge represents a relationship between two memory blocks, when a memory block contains pointers.

Each memory block is represented by a vertex v in the MSR graph. The following terminology is used:

head(v): the starting address of memory block v type(v): the type of object stored in the memory block v elem(v): number of objects of type type(v) in memory block v. The address of the memory block refers to any address within the memory block. Let addr be an address in the program memory space. The predicate Address_of(x, v) is true if and only if head(v) $\leq x \leq$ head(v)+((unit_size*elem(v)), where unit_size is the size of an object of type type(v).

Figure 8B:
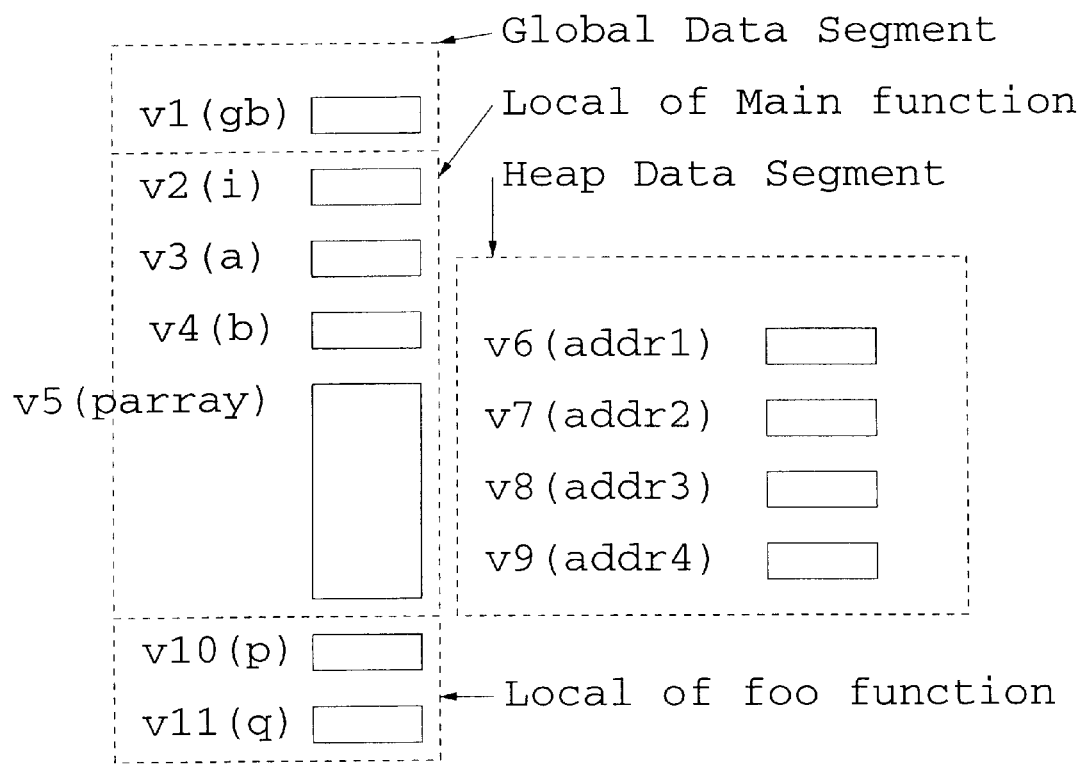

Given an example program in FIG. 8(a), FIG. 8(b) shows all memory blocks in the snapshot of the program memory space just before execution of the memory allocation instruction at line 17 in the function foo, assuming that the "for loop" at line 13 in the main function has been executed four times before the snapshot was taken. Each memory block in FIG. 8(b) is represented by a vertex name $v_i$, where $1 \leq i \leq 11$. The associated variable name for each memory block is also shown in parentheses. We assume that $addr_i$, where $1 \leq i \leq 4$, is the address of the dynamically allocated memory block created at runtime. $addr_i$ represents the name of the memory blocks in this example.

In a stack-based language such as C, a process generally manages its memory space in four segments: code, global data, stack, and heap. The code segment contains machine instructions of every function. The global data segment is a memory storage of global variables and statically initialized data. During execution, a block of memory is allocated to each global variable. The size of each memory block could be varied depending on how its associated variable is defined. The lifetime of a global variable is the time from the start to termination of its mother program.

The stack segment is a memory space used to store local variables, parameter passing in function calls, and other supporting information to keep track of function calls in the program. An activation record is a representation of a function in the stack segment. It contains memory spaces for parameters and local variables of the function. When a function is called, its associated activation record is pushed to the top of the stack segment. The memory spaces of parameters and local variables, which are a part of the activation record, can then be accessed during execution of the function. When the function terminates, its activation record is popped out of the stack segment. Thus the lifetime of the local and parameter variables of a function is limited to the execution of the function.

Finally, the heap segment is a memory space provided for dynamic allocation of memory storage during execution of the program. The heap memory allocation is usually performed by a programming language statement such as a call to a function malloc in C. The allocated space can also be deallocated to give back the memory space to the heap segment. This can be done by a statement such as a call to a function free in C. The lifetime of the allocated memory spaces thus spans the period from creation by the memory allocation statement to destruction by the deallocation statement.

For data collection and restoration, the memory blocks can reside in different areas of the program memory space. If a memory block is created in the global data segment, it is called a global memory block. If it is created in the heap segment by dynamic memory allocation instruction, it is called the heap memory block. If the memory block resides in the activation area for a functions in the stack segment of the program, it is called the local memory block of function f. Let Gm, Hm, $Lm_{main}$, and $Lm_{foo}$ represent sets of global memory blocks, heap memory blocks, local memory blocks of function main, and the local memory block of function foo, respectively. From FIG. 8, we can define $Gm=\{v_1\}$, $Hm=\{v_6, v_7, v_8, v_9\}$, $Lm_{main}=\{v_2, v_3, v_4\}$, and $Lm_{foo}=\{v_{10}, v_{11}\}$.

Figure 9:
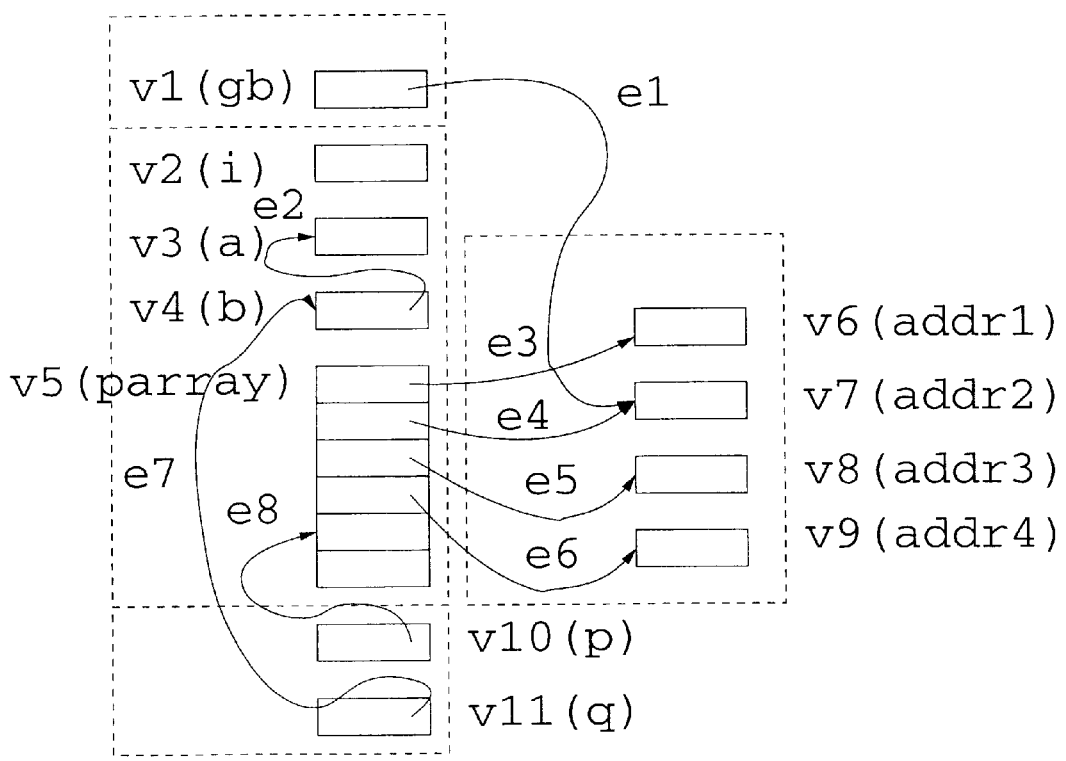
FIG. 9 shows an example of the MSR graph.

FIG. 9 shows an MSR graph representing a snapshot of memory space for the example program in FIG. 8(a). The edges $e_i$, where $1 \leq i \leq 8$, represent the relationships from the pointer variables to the addresses of their reference memory blocks.

One of the most important properties of a memory block is its data type. A memory block comprises one or more objects of a particular type. Each type describes a set of properties for the same kind of data and associates a set of functions to manipulate the data objects. To support data collection and restoration during process migration, we need to provide certain information and operations to manipulate data of the specific type stored in the memory block.

Every type to be used during the execution of the program will be recognized at compile-time. This type information is used to construct the Type Information (TI) table which contain information and functions to save and restore the memory block nodes used for data collection and restoration during process migration.

At compile-time, a unique number, the Type Identification (Tid) number, is assigned to every type to be used during the execution of the program. The information of every type used in the program is stored in the TI table. The type-specific saving and restoring functions to encode and decode data are also created to transform the contents of the memory block to and from the machine-independent information stream. This information, along with these functions, is annotated in the global declaration section of the program source code to allow global access during execution of the program.

The TI table is indexed by the Tid number. It contains the following fields:

(1) unit size (unit_size): size in bytes of the object of a particular type. In the case of an array type, the unit size is the size of the object of the array content. Otherwise, the unit size is the size of the object of the given type.

(2) number of elements (elem): If the object has type array, the number of elements in the array is assigned to this field. Otherwise, this field is 1.

(3) number of components (compo): In case the type is a structure type, we assign the number of the components of the structure to this field. Otherwise, this field is assigned the value 1.

(4) a pointer to component layout table (component_layout): The component_layout table contains information about the format of a structure type. Each record in the table supplies information for a component of the structure. This table is used to translate the offset of any pointer address, relative to the beginning address of the memory block, to machine-independent format and vice versa. The record in the component_layout table contains the following information:

(a) The beginning offset of the corresponding component relative to the beginning position of the structure.

(b) If the type of the component is not an array, the Tid number of the component is assigned to this field. Otherwise, the Tid number of the array content is assigned.

(c) The number of elements is assigned to this field if the component is an array. If not, this field is assigned to 1.

(5) Tid number of the content of the pointer or array (Tid_content): In case the type is a pointer or array, the Tid number of the object to which the pointer refers, or the content of the array, is assigned to this field. Otherwise, the field is left empty.

(6) saving method (Saving): This field contains a function to save the content of the memory block of a particular type in the program memory space into a stream of machine-independent information. This function is used while collecting information in the memory space of the migrating process.

(7) restoring method (Restoring): This field contains a function to rebuild a memory block of a particular type in the appropriate memory location. This function is used during the restoration of the memory space of a new process on a new machine.

Note that the name in parenthesis associated with each field is its field_name. Notation TI[tid].<field_name>, where tid represents a type identification (Tid) number, represents the content of the field field_name in the TI table.

The following code shows examples of Tid numbers, a saving function, and the programming interface to save a variable of the source code in FIG. 8(a). An example of Type Identification number:

```
#define    TypeStructTree                      1
#define    TypePtr_to_StructTree               2
#define    TypePtr_to_Ptr_to_StructTree        3
```

An example of the Saving Function for data type "struct tree":

```
int Pack_StructTree(char *mem_block, int type_id, int length) {
    struct tree *target_mem = (struct tree *) mem_block ;
    ...
    for(i = 0; i < length; i++) {
        pack_float( target_mem->d1, Type_Float, 1 );
        pack_Int( target_mem->d2, Type_Int, 1 );
        save_pointer( target_mem->d3,
TypePtr_to_Array10_to_Ptr_to_Int ) ;
        save_pointer( target_mem->left, TypePtr_to_StructTree ) ;
        save_pointer( target_mem->right, TypePtr_to_StructTree ) ;
```

An example of the Programming Interface to save the pointer variable "p":

```
    save_pointer( p, TypePtr_to_Ptr_to_StructTree ) ;
```

The Tid number is the index of the TI table. The Tid number for data types struct tree, struct tree*, and struct tree** are defined as 1, 2, and 3, respectively. In the saving function for the data type struct tree, the function save_pointer is called to collect the pointer structure components, pointers which are the components d3, left, and right. An example is the programming interface to save the pointer variable p, defined as a local variable in the function foo in FIG. 8(a). This function call statement is inserted in the body of the function foo to collect value of the variable p.

The saving and restoring methods are the most important functions in the TI table to be used during memory block collection and restoration. Once process migration is started on the source machine, the data collection and restoration algorithms identifies the memory blocks to be collected. The saving function encodes the contents of the memory blocks in machine-independent format, and makes them a part of the machine-independent information stream for process migration. After transmitting the information to the new machine, the restoring function extracts the information for the memory block from the stream, decodes it, and stores the results in the appropriate place within the memory space of the new process.

When the memory block does not contain any pointers, one can apply techniques to encode and decode contents of a memory block to and from the XDR information stream using the XDR software package to construct the saving and restoring functions. However, if the memory block does contain pointers, one uses functions save_pointer(pointer_content, tid) and restore_pointer(tid), where pointer_content represents the memory address stored in a pointer and tid is the Tid number of the pointer, to save and restore the pointers, respectively. The save_pointer function initiates the traversal through the connected components of the MSR graph in a depth-first search manner. It examines the memory block to which the pointer refers and then invokes the appropriate saving function stored in the TI table to save the contents of the memory block. The following code shows a generic example of a saving function:

Function pack_td(obj_mem_address, tid, element_num)

1: Cast obj_mem_address to be the pointer to td
2: For i=1 to element_num do
3: For each component of the structure pointed to by obj_mem_address do
4: If the component is not a pointer, the function pack_compTD, where compTD is the type of the component, is called to save the data content. Otherwise, the function save_pointer is called to save the pointer.
5: od;
6: Move obj_mem_address to point to the address of the next memory content of the type td;
7: od; Note that td is the type name of the data to be saved and that tid is the type identification number of the type td. The visited memory blocks are then marked so that the same blocks are not saved again by save pointer.

On the other hand, restore_pointer recursively rebuilds the memory blocks in the memory space of the destination machine according to the information saved by save_pointer. To restore the contents of a memory block, restore_pointer invokes an appropriate restoring function stored in the TI table. The following code shows a generic example of a restoring function:

Function unpack_td(obj_mem_address, tid, element_num)

1: Cast obj_mem_address to be the pointer to td
2: For i=1 to element_num do
3: For each component of the structure pointed to by obj_mem_address do
4: If the component is not a pointer, the function unpack_compTD, where compTD is the type of the component, is called to restore the data content. Otherwise, the function restore_pointer is called to restore the pointer.
5: od;
6: Move obj_mem_address to point to the address of the next memory content of the type td;
7: od;

In conjunction with the TI table, the MSRLT data structures track memory block nodes of the MSR graph. For further efficiency, a practical scheme to reduce the amount of information stored in the MSRLT data structures is used. The functions of MSRLT data structure are the following:

(1) to track information to transfer each memory block into machine-independent format. Specific data about memory blocks such as Tid number, size of each element, and number of elements is used when the information stored in those memory blocks is translated to the machine-independent information stream.

(2) to support searching of memory blocks during the data collection operation. The saving functions are recursively invoked to collect memory blocks, following the MSR graph nodes, in a depth-first search manner. During the search, the item in the MSRLT data structure corresponding to each memory block is marked when the memory blocks are collected. Marked memory blocks are not collected a second time. Thus, this scheme prevents the duplication of transmitted data during process migration.

(3) to provide machine-independent identification to memory blocks. In program memory space, the memory blocks are identified by address. However, since the memory addressing scheme can be different on computers with different architectures, a logical scheme is used to identify the memory blocks during the data transmission between the two processes.

In practice, keeping track of all memory blocks is generally unnecessary. Only the memory blocks that are visible to multiple functions, and those that are or that may be pointed to by any pointers during the execution of the program need to be recorded for process migration. In the MSR graph these vertices are called significant nodes, and others are called trivial nodes.

The significant nodes and their properties are recorded in the MSRLT data structures. We classify nodes in the MSR graph into two types. During process migration the significant nodes can be "visited" multiple times due to their multiple references; the trivial nodes are visited only once via their variable names or memory addresses. To prevent multiple copies of significant memory blocks from being transmitted during process migration, the significant nodes are registered so that the status of the nodes can be checked.

If a memory block is a global or local variable, its properties are recorded in the MSRLT data structure if and only if the following conditions are satisfied:

(a) The memory block of a global variable is referred to in multiple functions or in a function with possibility of direct or indirect recursions. During execution, since the memory blocks can be accessed from more than one function in the activation record, the memory blocks can become significant nodes in the MSR graph.

(b) The memory block's address (any addresses that satisfy the Address_of predicate) is or could be assigned to any pointer, or could be used in the right hand side of any pointer arithmetic expression during program execution. In C, since the address of the memory block is defined by the '&' operator, the address of the variable that applies '&' is registered to the MSRLT data structure. In the case of an array variable, the variable name represents the starting address of the array memory block. Therefore, if the array name is used in the right hand side of the pointer arithmetic statement, the information of the array memory block should also be registered to the MSRLT data structure. This condition is applied to both global and local variables.

These conditions can be verified at compile-time. The compiler scans every programming language statement to detect the use of each variable declared in the program. Instructions to enter the information of the detected global variables to the MSRLT data structure are inserted at the beginning of the main function's body: the detected local variables are inserted at the beginning of the function in which they are declared. If local variables belong to the main function, the MSRLT registration instructions are inserted after those of the global variables. These instructions are called the MSRLT Programming Interfaces.

In the case of a dynamically allocated memory block in the heap segment of the program, the starting address of the memory block is assigned to a pointer variable. One can access the memory block either by directly referring to its address, any address that satisfies the Address_of predicate for the particular memory block, or by referring to the content of the pointer. Therefore, one registers information of every dynamically allocated memory block to the MSRLT data structure.

In our design, we create a function to wrap up the original memory allocation statement in the program. In our C language prototype, we replaced the original malloc function by the HALLOC function. For example, the statement . . . =(struct tree *) malloc(sizeof(struct tree) ); was replaced by . . . =(struct tree *) HALLOC( tid, sizeof(struct tree) ); where tid is the Tid number of struct tree.

The HALLOC function calls malloc and registers information of the allocated memory block to the MSRLT data structure. Let Gs, Hs, $Ls_{main}$, and $Ls_{foo}$ be sets of the significant nodes of the global data segment, heap data segment, local data of function main, and local data of function foo, respectively. From the example program and its memory blocks in FIG. 8, we get Gs={ }, Hs={$v_6$, $v_7$, $v_8$, $v_9$}, $Ls_{main}$={$v_3$, $v_4$, $v_5$ }, and Lsfoo={ }.

Figure 10:
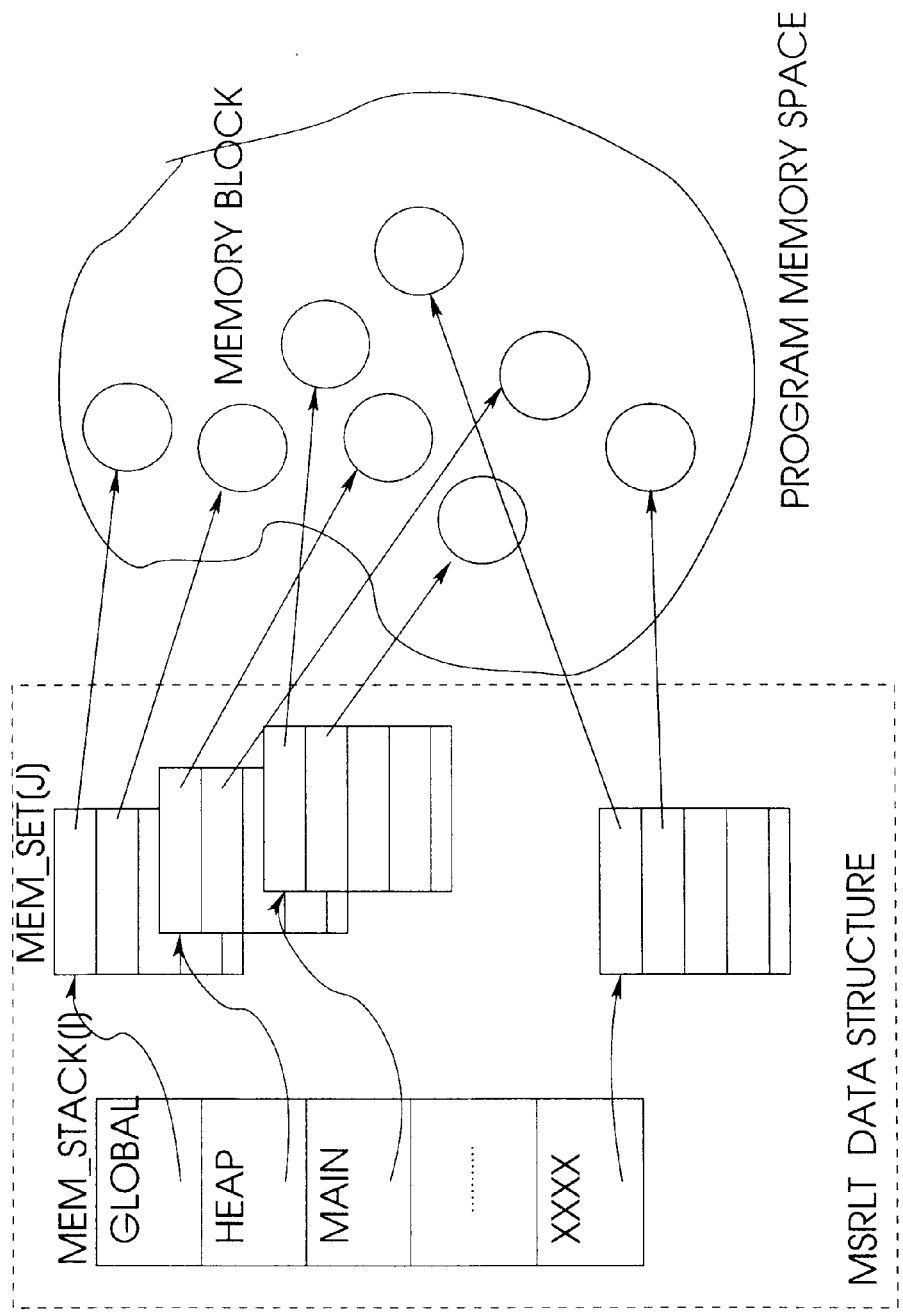
FIG. 10 shows the MSRLT data structures.

The architecture of the MSRLT data structures gives a logical mechanism for identifying MSR memory block nodes across machines. The MSRLT data structure is used to track information of every significant memory block in the program memory space. It also provides each memory block a logical identification that can be used for reference between two machines during process migration. FIG. 10 shows an example of the MSRLT data structure.

The structure comprises two tables: the mem_stack and mem_set tables. The mem_stack table is a table that keeps track of the function calls in the program activation record. Each record in the table represents a particular data segment of the program. The first record, denoted by mem_stack[0], is used for information of a set of significant memory blocks of the global variables. The second record, mem_stack[1], contains information of a set of significant memory blocks in the heap segment. The third record is used for the set of significant memory blocks of local variables of the main function. The rest are used for the significant memory blocks of local variables of each function call in the activation record. A record of the mem_stack table comprises two fields: a pointer to a mem_set table, and the number of records in the pointed mem_set table.

The mem_set table is used to store information of every significant memory block of a data segment of the program represented by a record in the mem_stack table. Each record in the mem_set table comprises the following fields:

tid, type identification number of the object contained in the memory block.

unit_size, size in bytes of each object in the memory block.

element_num, the number of objects stored in the memory block.

mem_block_pointer, a pointer to the starting address of the memory block.

marking_flag, a marker used to flag whether the memory block has been "visited" during the memory collecting operation.

When the program begins execution, the first three records of the mem_stack table are created. Then, whenever a function call is made, a mem_stack record is added to the mem_stack table in stack-like manner. If there are any significant local variables in the function, they are added to the mem_set table of the last mem_stack record. After the function finishes execution, the mem_stack record as well as its mem set table are destroyed. In the case of memory blocks in the heap segment, the information in the memory block allocated by the function malloc is added to the mem_set table of the mem_stack[1] record. The information is deleted from the mem_set table when the free operation is called.

Each significant memory block is identified by a pair of indices, its mem_stack and mem_set records. This identification scheme is used as a logical identification of significant memory blocks across different machines. Let v, stack_index(v), and set_index(v) be a significant MSR node, the index of its mem_stack record, and the index of its mem_set record, respectively. The logical representation of v is given by (stack_index(v), set_index(v)).

Each edge in the MSR graph is represented by a pair of source memory addresses: the memory address of a pointer and the memory address of the object to which the pointer refers. Pointers are represented by edges of the MSR graph, in a machine-independent format. Such a format is illustrated in FIG. 11.

Figure 11:
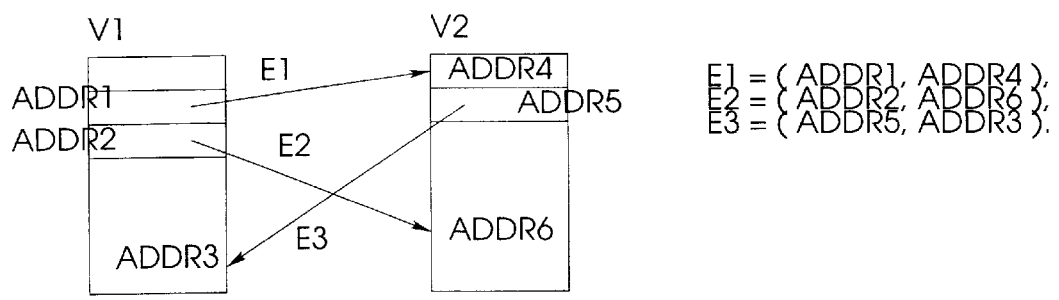
FIG. 11 shows a representation of a pointer between two nodes of the MSR graph.

There are three edges between nodes $v_1$ and $v_2$ in FIG. 11. For example, edge $e_1$ can be represented in the form of ($addr_1$, $addr_4$) where $addr_1$, and $addr_4$ are addresses that satisfy the predicate Address_of for node $v_1$ and $v_2$, respectively. $addr_1$ is a pointer object that contains the address $addr_4$ in its memory space. Therefore, given $addr_1$ one always obtains $addr_4$ as its content. By taking a closer look at $e_1$, one can also write it in the form of ($addr_4$, head($v_2$)+($addr_4$-head($v_2$))). The address head($v_2$) is called the pointer head, and the number ($addr_4$-head($v_2$)) is called the absolute pointer offset.

The representation of a pointer in machine-independent format comprises the machine-independent representations of the pointer head and the pointer offset. Under the definition of significant memory block, the node pointed to is always a significant node. Thus, its properties are stored in the MSRLT data structure. From the example in FIG. 11, the logical identification of $v_2$ can be represented by (stack_index($v_2$), set_index($v_2$)). This logical identification is used to represent the pointer head in the machine-independent information stream for process migration.

To represent the offset of the pointer in machine-independent format, one transforms the absolute pointer offset into a sequence of (component position, array element position) pairs. The component position is the order of the components in the memory space of a structure to which the pointer refers. The array element position is the index to the array element that has the pointer pointing to its memory space.

Figure 12:
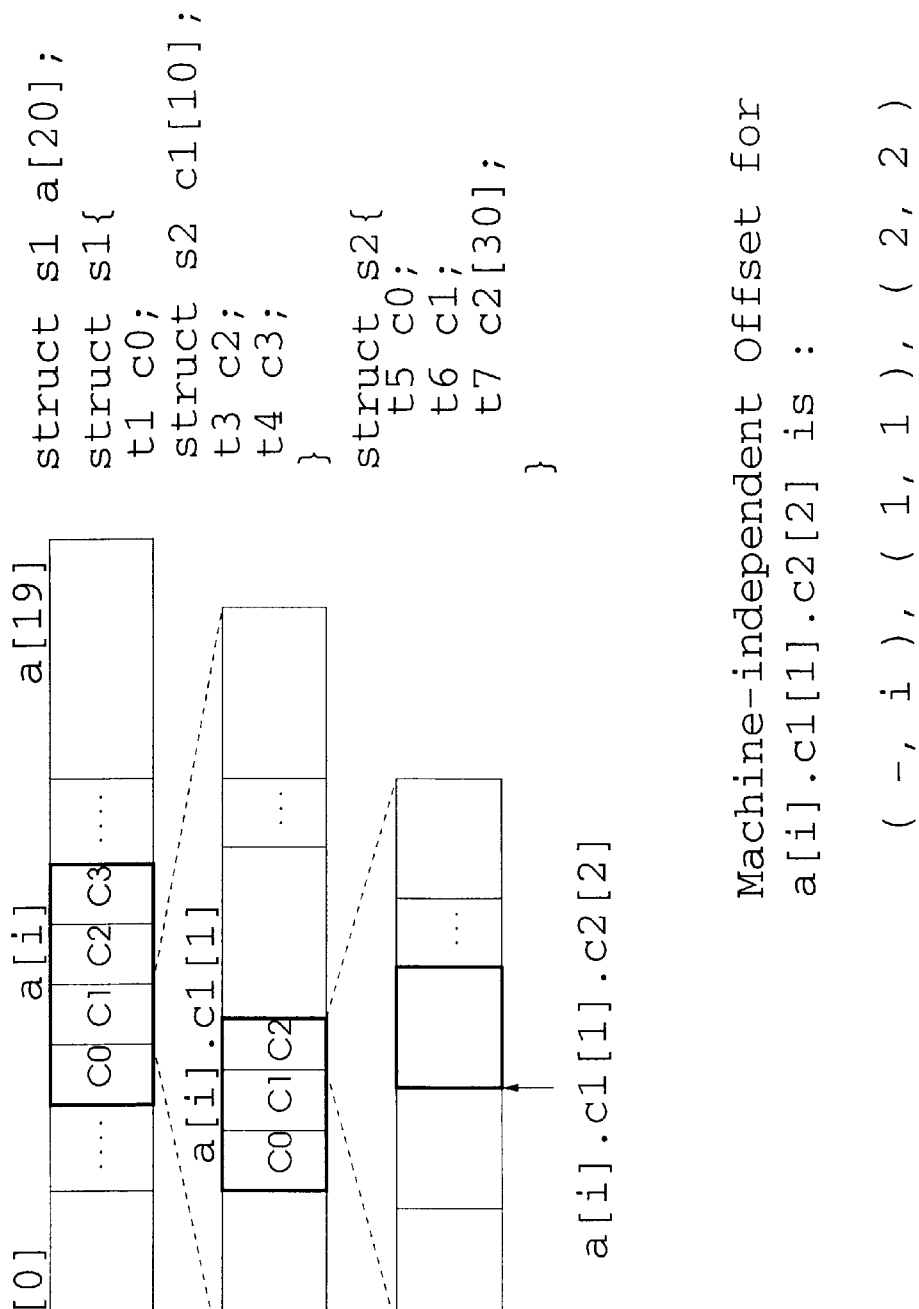
FIG. 12 shows an example of the machine-independent format of a pointer offset.

For example, the absolute pointer offset (&a[i].c1[1].c2[2]]-a) of the memory block of the variable a in FIG. 12 can be translated to <(-,i),(1,1),(2,2)>. Note that indexing starts from zero and that the component position of the first pair was not used. From the first pair, the array position indicates that the pointer points to the (i+1)st element of array a. The component position part of the second pair (1,1) means that the pointer points to the second component of the structure stored in a[i], which is a[i].c1. The array element position part of (1,1) indicates that a[i].c1 is the array, and that the pointer points to the second element of that array, a[i].c1[1].

Finally, the component position of the pair (2,2) means that a[i].c1[1] is the structure, and the pointer falls on the third component of a[i].c1[1], which is a[i].c1[1].c2. The array element position of the pair (2,2) indicates that the component a[i].c1[1].c2 is the array, and that the pointer points to the third element of a[i].c1[1].c2, which is a[i].c1[1].c2[2]. A sequence of machine-independent pointer offsets can be generated from a given absolute pointer offset using the information provided in the component_layout tables. The absolute pointer offset can also be derived from the machine-independent offset using the same information.

To represent the transformation between the absolute and machine-independent pointer offsets, let mach_indep of set(x) and abs_offset(y) represent the machine-independent pointer offset of the absolute pointer offset x and the absolute pointer offset of the machine-independent pointer offset y, respectively.

The programming interfaces to collect and restore data in the program memory space can be applied to any variable of the source and destination processes. The algorithm for collecting and restoring data in the MSR memory space must be created for the applicable source code chosen.

The interfaces of the MSR graph data collection operations are categorized into two types according to the type of the variables. Let x be a variable and tid be the Tid number of x. If tid is a pointer type, the interface used to save x is save_pointer(x, tid). Otherwise, it would be save_var(&x, ptid, TI[tid].<elem>), where ptid is the Tid number of a type of pointer to an object of the type represented by tid.

In the case of a pointer, save_pointer is used to save the pointer content, the address stored in a pointer x. The saving function is not applied in the TI table to save pointer x directly, because the memory block to which x points is necessarily a significant memory block. Since the significant memory block is registered to the MSRLT data structures, its contents are collected in an appropriate manner. save_pointer is also used in the saving function in the TI information table if the memory block of a particular data type contains pointers.

If tid is not the Tid number of a pointer type, the variable x is viewed as a memory block of type represented by tid and of size TI[tid].<elem>. However, one cannot simply apply the saving function in the TI table to save x, because x might be a significant memory block whose information is stored in the MSRLT data structure. Thus, the memory address &x, the starting memory address of the memory block of x, and ptid are parameters of the interface.

These parameters are passed to the function save_variable as shown at line 2 of the algorithm below:
Function save_var(start_memory_address, ptid, elem_num)
1: For i=1 to elem_num do
2: Call save_variable(start_memory_address, ptid);
3: Set start_memory_address to point to the address of the next memory content of the memory block;
4: od;
Note that ptid is the Tid number of the type of pointer to the type represented by tid. The function of save_variable is similar to that of save_pointer; however, save_variable is designed to save the content of the trivial memory block.

Two interfaces are used to rebuild the memory space of the new process by reading the contents of the machine-independent information stream. They are the functions restore_pointer and restore_var. Let x be a variable with a type corresponding to the Tid number tid. If x is a pointer, use x restore_pointer(tid) to restore x; and restore_var(&x, ptid, TI[tid].<elem>) is used to restore the content of x.

The function restore_pointer is used to rebuild the program data structures saved by save_pointer. In the memory rebuilding process, restore_pointer may allocate memory space, create the appropriate MSRLT data structure, and restore the contents of the significant memory blocks. When finished, restore_pointer returns the appropriate memory address to x.

Likewise, the function restore_var shown below restores the memory contents saved by save_var:
Function restore_var(start_memory_address, ptid, elem_num)

1: For i=1 to elem_num do
2: Call restore_variable(start_memory address, ptid);
3: Set start_memory address to point to the address of the next memory content of the memory block;
4: od;

Since the variable x could be a significant node in the MSR graph, the starting memory address &x is treated as a pointer of type associated to ptid, pointing to the memory block of x. Also, restore_var calls the function restore_variable, which has a function similar to restore_pointer. The function restore_variable restores the trivial nodes of the MSR graph.

In the function save_pointer, the pointer content, which is a memory address to which the pointer refers, and the tdid, the type identification number of the pointer type, are passed as parameters. An algorithm illustrating function save_pointer is shown below:

Function save_pointer(pointer_content, ptid)
1: If pointer_content is NULL Then
2: Write a flag FALSE to the information stream and Return;
3: fI
4: Search MSRLT data structure to find a significant node v that the predicate address_of(pointer_content,v) is true;
5: If the predicate is true Then
6: Write the marking_flag of v in the MSRLT data structure to the stream;
7: Write tdid,TI[ptid].<tid_content>, stack_index(v), and set_index(v) to the stream;
8: If the marking_flag=CLEAR Then
9: Set marking_flag to MARKED;
10: Write elem(v) to the stream;
11: Call TI[TI[ptid].<tid_content>].<Saving>(head(v), TI[ptid].<tid_content>, elem(v));
12: Write mach_indep_offset(pointer content-head(v)) to the information stream;
13: Else { marking flag is MARKED }
14: Write mach_indep_offset(pointer_content-head(v)) to the information stream;
15: fI
16: Else
17: Report "There might be a dangling pointer in the program";
18: fI First one checks if the pointer content is NULL. If so, the function writes the flag FALSE to the machine-independent information stream, and returns to its caller. Otherwise, it searches the MSRLT data structure to find a significant memory block node v such that the Address_of(pointer content,v) predicate is satisfied. If such a v cannot be found, the pointer could be dangling and is reported. After v is found, the properties of the node in the MSRLT data structure such as marking flag, stack index(v), and set index(v) as well as the type information of the pointer and the pointed node are written to the output information stream.

If the marking_flag is CLEAR, the node v in the MSR graph has not been saved before. Thus one saves the number of data objects in the memory block node v, elem(v), and invokes the function TI[TI[ptid].<tid_content>].<Saving> to save its contents. If node v contains any pointers, the function save_pointer is called to traverse and save nodes in the MSR graph. However, in any situation the result of the saving function TI[TI [tdid].<tdid_content>.<Saving> is considered as the contents of node v. Then, at line 12 of save_pointer, the machine-independent pointer offset mach_indep_offset(pointer_content-head(v)) is saved to the stream before the termination of the function.

If the marking flag is MARKED, the contents of v are skipped since they will have already been saved to the information stream. Only the machine-independent pointer offset is saved before the function returns to its caller.

The save variable function is largely identical to the save_pointer function, except the code on line 17 of save_pointer will be replaced by lines 17 and 17a shown below.

Function save variable(pointer_content, ptid)
16: Else
17: Write the TRIVIAL flag to the information stream;
17a: Call TI[TI[ptid].<tid_content>].<Saving>(pointer_content, TI[ptid].<tid_content>, TI[TI[ptid].<tid content>].<elem>);
18: fI Since some of the memory blocks of the global or local variables could possibly be significant memory block nodes, the function save_variable performs most of its operations similarly to those of save pointer. The new lines 17 and 17a are used to save the contents of the trivial nodes in the program memory space.

Figure 13:
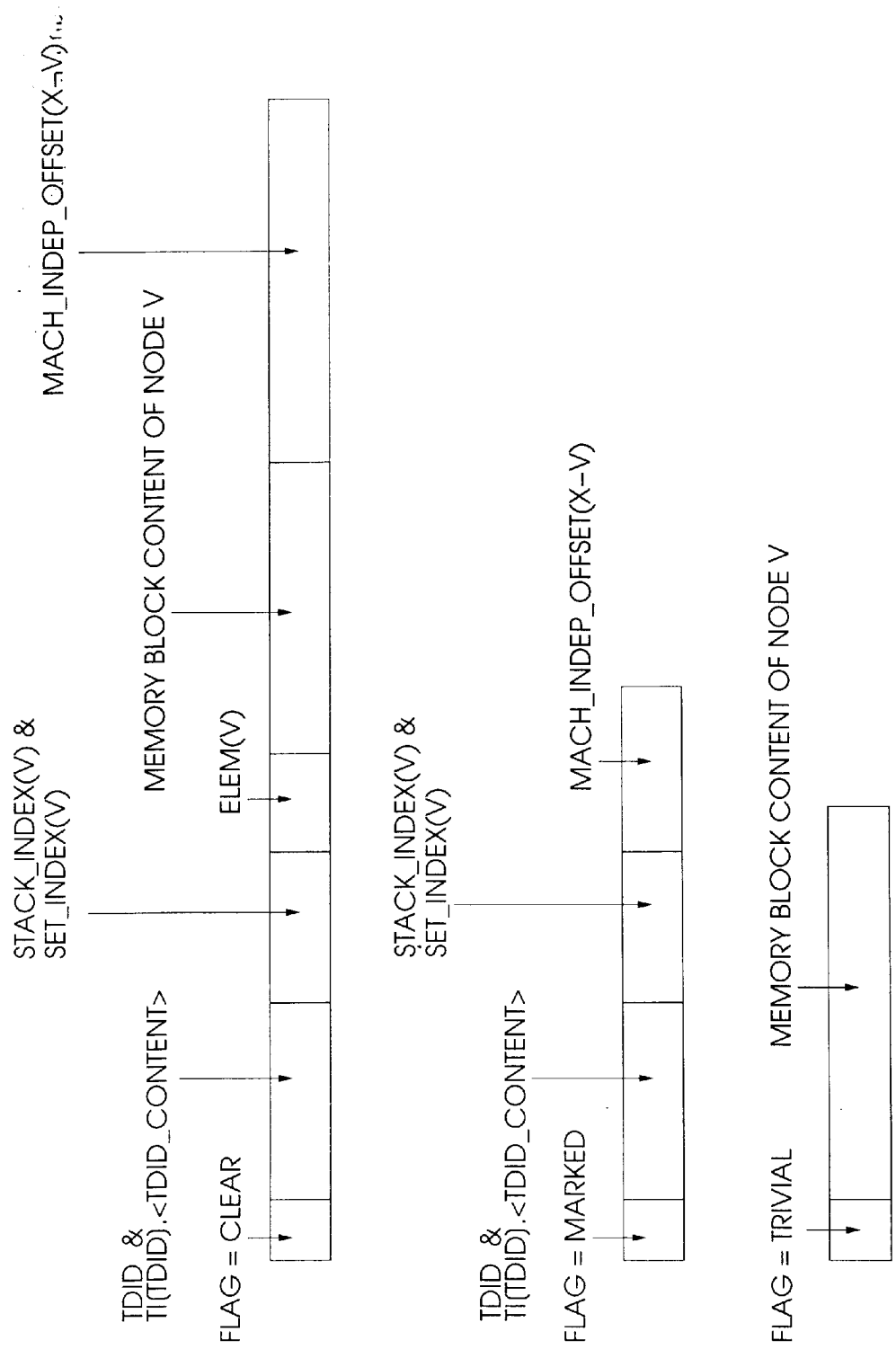
FIG. 13 shows different formats of the output information stream of the saving function.

FIG. 13 shows the different output information streams obtained by applying the save_pointer and save_variable functions. Both functions produce the first two formats in FIG. 13. The first format is the output of the functions when the marking flag is CLEAR. The second is the output when marking flag is MARKED. The last is the output of the function save_variable when the memory block of the starting memory address pointer_content is a trivial node.

In function restore_pointer shown below, the function reads a flag from the information stream first.

Function restore_pointer(ptid) return pointer_content
1: Read temp_flag from the information stream;
2: If temp_flag=FALSE Then
3: Return NULL;
4: fI
5: If temp flag=CLEAR or MARKED Then
6: Read ptid, TI[ptid].<tid_content>, stack_index(v), and set_index(v) from the stream;
7: If the temp_flag=CLEAR Then
8: Read elem(v) from the information stream;
9: Set the contents of the mem stack and mem_set records in the MSRLT data structure for a significant node v;
10: If stack_index(v)=1 Then { Heap }
11: Create a memory block for v in the Heap segment;
12: Call TI[TI[ptid].<tid_content>].<Restoring>(head (v), TI[ptid].<tid_content>, elem(v));
13: Read the machine-independent pointer offset y from the information stream;
14: Return head(v)+abs_offset(y);
15: Else {v is significant variable memory block}
16: { In this case, the memory space for v is already allocated by the program }
17: Call TI[TI[ptid].<tid_content>].<Restoring >(head (v), TI[ptid].<tid_content>, elem(v));
18: Read the machine-independent pointer offset y from the information stream;

19: Return head(v)+abs_offsetty);
20: fI
21: Else { temp_flag is MARKED }
22: { In this case v has already been rebuilt }
23: Read the machine-independent pointer offset y from the information stream;
24: Return head(v)+abs offset(y);
25: fI
26: Else
27: Report "Invalid information stream";
28: fI If the flag is FALSE, the function returns a NULL value to the pointer variable. Otherwise, it reads type information as well as the information needed to restore the MSRLT data structures. If the flag is CLEAR, the function reads the number of data objects to be stored in the memory block node v, elem(v). The information of v in the MSRLT data structure is updated according to this information.

If the memory block node v is to be rebuilt in the heap segment of the program, the memory block is allocated, and then the function TI[TI ptid].<tid_content>].<Restoring> at line 12 in restore_pointer is invoked to restore the contents of node v. After that, the machine-independent pointer offset, y, is read from the stream, transformed to abs_offset(y), and then added to the starting address of v. The result is returned to the caller function as the memory address that is stored in a pointer. If v is a significant variable memory block, we assume that the memory space for the block is already allocated. Thus, the instructions in restore_pointer from line 17 to 19 should be performed appropriately. On line 21, if the flag is MARKED, one will just read the machine-independent pointer offset and restore the content of the pointer.

The restore_variable function is identical to the restore pointer function except that line 27 of restore_pointer is replaced by line 27 and 27a shown below.

Function restore_variable(ptid) return pointer_content
26: Else
27: { this alternative implies that the flag is trivial }
27a: Call TI[TI[ptid].<tid_content>].<Restoring>(pointer content, TI[ptid].<tid_content>, TI[TI[ptid].<tid_content>].<elem>);
28: fI Due to the possibility that some of the memory blocks of the variables could be significant memory block nodes, the function restore_variable performs most operations similar to restore_pointer. The major difference between them is that new lines 27 and 27a of restore_variable are used to restore the contents of the trivial nodes.

Figure 14:
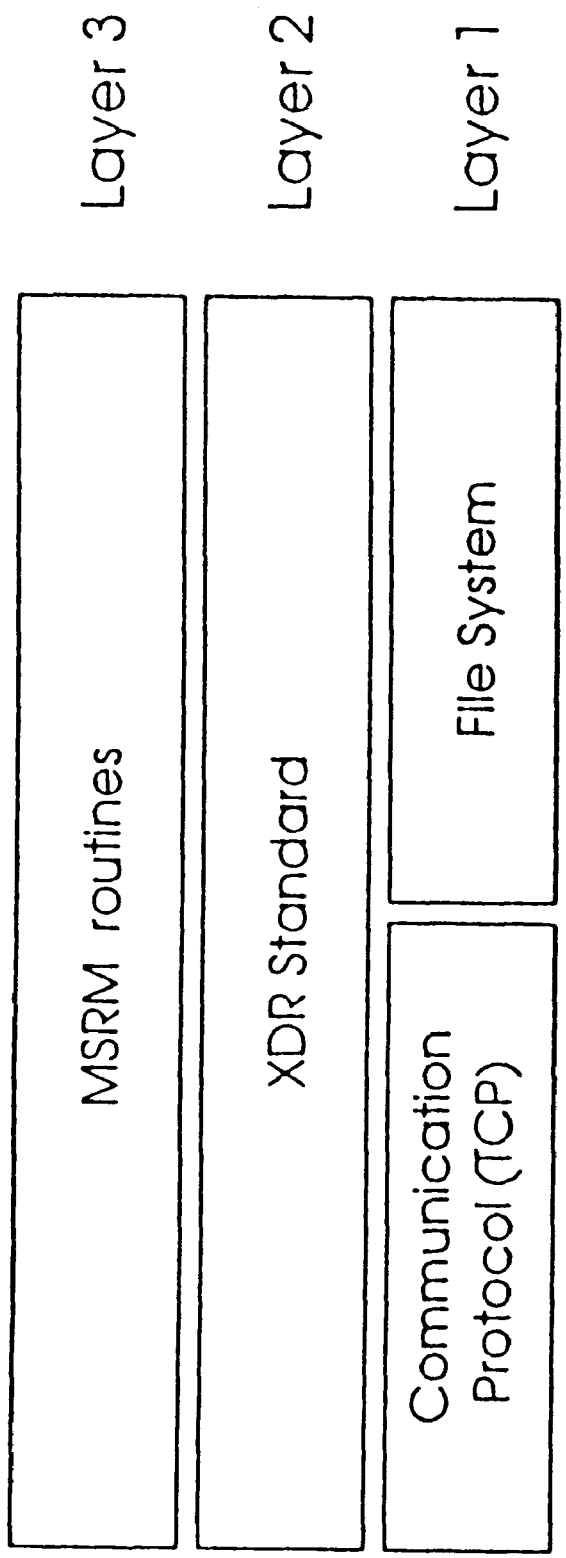
FIG. 14 shows the three layers of routines for data collection and restoration in heterogeneous environment.

Software for a heterogeneous data transfer environment includes various functional modules. These modules can be classified into three layers as illustrated in FIG. 14. The first layer uses basic data communication and file system utilities. The migration information can be sent to the new machine using, for example, the TCP protocol, the shared file system, or the remote file transfer if the file systems of two machines involved in the process migration are separate.

In the second layer, XDR routines, for example, are used to translate primitive data values such as 'char', 'int', or 'float' of a specific architecture into machine-independent format. In the third layer, an MSR Manipulation (MSRM) library routine, comprising the data collection and restoration interfaces and routines as well as the MSRLT interfaces and routines, translates complex data structures such as user-defined types and pointers into a stream of machine-independent migration information. The MSRM routines are called by the migration macros annotated to the program.

To verify the correctness of the model and algorithms, we have conducted successful experiments on three programs with different kinds of data structures and execution behaviors. They are the test_pointer, the unpack benchmark, and the bitonic sort programs. These programs are migration-safe. The program analysis and annotated migration operations of MpPVM, adapted for the BDT mechanism, were applied to make them migratable in a heterogeneous environment.

Figure 15A:
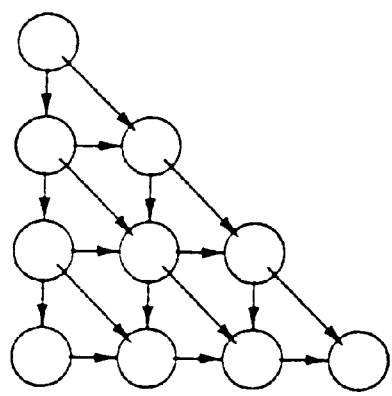
FIGS. 15a and 15b show the MSR graphs for (a) test_pointer and (b) bitonic sort programs respectively.
Figure 15B:
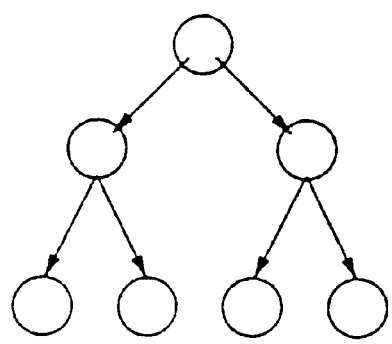

First, test_pointer is a program that contains various data structures, including pointer to integer, pointer to array of 10 integers, pointer to array of 10 pointers to integers, and a tree-like data structure. The MSR graph of the tree-like data structure is shown in FIG. 15($a$). The root pointer of the tree is a global variable.

Two different data sizes were used in our experimental tests. One had 11,325 nodes; the other 31,375 nodes. The program worked in two steps. It first generated and initialized every data structure, and then traversed the tree-like structure. In our experiment, we conducted process migration in the main function after all data structures were generated and initialized. After the migration, the tree-like data structure was traversed on the migrated machine.

Second, the linpack benchmark from the netlib repository at ORNL is a computational intensive program with arrays of double and arrays of integer data structures. Pointers are used to pass parameters between functions. The benchmark solves a system of linear equations, Ax=b. Most variables in this program are declared in the main function. We performed two experiments on this program, with two different problem sizes. First, the program solved a matrix problem of order 200. The size of the matrix A in this case was 200*200. In the second test, the order of matrix was increased to 1000. The size of matrix A increased to 1000*1000. At run-time, we forced the program to migrate when the function DAXPY was executing with a function call sequence main( )→DGEFA( )→DAXPY( ), which means that the function main( ) called the function DGEFA( ), which in turn called the function DAXPY( ).

Finally, the bitonic sort program was tested. In this program a binary tree, illustrated in FIG. 15($b$), is used to store randomly generated integer numbers. The program manipulates the tree so that the numbers are sorted when the tree is traversed. The root of the tree is defined in the main function. Dynamic memory allocation operations and recursions are used extensively in this program. Two different problem sizes were again tested in our experiments. One was a tree with 1,024 nodes; the other was a tree with 4,096 nodes. Process migration was conducted in function bimerge( ) with a sequence of function recursive calls, main( )→bisort( )→bisort( )→bisort( )→bisort( )→bimerge( )→bimerge( )→bimerge( )→bimerge( ).

In each experiment, we originally ran the test program on a DEC 5000/120 workstation running Ultrix, and then migrated the processes to a SUN Sparc 20 workstation running Solaris 2.5, so that the migration was truly heterogeneous. Both machines were connected via a 10 Mbit/s Ethernet network. Each machine had its own file system. All test programs were compiled with optimization using gcc on the Sparc 20 workstation, and cc on the DEC workstation.

Each experiment was performed in two modes: direct network process migration, and process migration through file systems. The former is the choice of MpPVM and MPVM, which were developed for load balance in a non-dedicated environment. The latter is the method used in checkpoint for fault tolerance. In network migration, migration operations scan a program's data structures and store the machine-independent migration information in a buffer.

After that, the buffer contents were sent over the network via the TCP transmission protocol. On the destination machine, migration operations used the received information to restore the execution state and data structures of the program. Thus, we estimated the migration time (Migrate) by summation of memory scan time (Scan), data transmission time (Tx), and memory restoration time (Restore). For migration through file systems, migration operations scanned the program's memory and wrote the migration information to a file.

After that, we remotely copied the file to the destination machine using the rcp utility. Then, the new process read migration information from the file and restored the data structure on the destination machine. The migration time (Migrate) was the sum of memory scan and write time (Scan&Write), remote copy time (Rcp), and the file read and memory restoration time (Read&Restore). The objectives of our experiments were:

(1) To verify that the proposed data collection and restoration methodology was correct and feasible for different applications;

(2) To compare the performance of direct network migration and file system based migration; and (3) To measure the times used in collecting and restoring data for applications with various data structures.

The results of our experiments are shown in Table 2.

migration gained significantly higher performance improvements than did process migration via file systems when the size of data transmitted was small. For example, the improvement ratio (Speed Up) of network migration compared to file migration for sort processes with data transmission sizes of (Tx size) 46,704 and 182,248 bytes, and the Linpack process with data transmission size of 325,232 bytes through file systems calculated at 41.72, 19.82, and 17.48, respectively. On the other hand, the network migration times of processes with large data transmission sizes such as the test_pointer process with data transmission size of 3,242,480 bytes, and the Linpack process with data transmission size of 8,021,232 bytes, appear to have lower performance gains, as indicated by the factors of 4.61 and 4.79 of the migration time through file systems over the network migration time, respectively.

When the size of the buffer that holds the migration information becomes large, a number of disk accesses are made implicitly by the memory swapping operations of the operating systems during process migration. Therefore, network process migrations with large data sizes tend to suffer performance degradation caused by a number of inevitable accesses to disks. Network process migrations with small data transmissions benefit most from direct network-to-network migration and obtain high performance improvement.

Nevertheless, since the cost of migrating a process with a large data transmission size either via network or through file systems is relatively high, the relatively small change of the comparison factor is significantly large in absolute

TABLE 2

Timing results of heterogeneous process migration

| Program | test_pointer (nodes) | | Linpack (matrix) | | bitonic (nodes) | |
|---|---|---|---|---|---|---|
| | 11,325 | 31,375 | 200 × 200 | 1000 × 1000 | 1,024 | 4,096 |
| NETWORK | | | | | | |
| Tx (problem) Size (bytes) | 1,165,680 | 3,242,480 | 325,232 | 8,021,232 | 46,704 | 182,248 |
| Scan (sec) | 2.678 | 14.296 | 0.303 | 5.591 | 0.150 | 0.419 |
| Tx (sec) | 1.200 | 4.296 | 0.357 | 9.815 | 0.053 | 0.191 |
| Restore (sec) | 2.271 | 4.563 | 0.095 | 2.962 | 0.077 | 0.278 |
| Migrate (sec) | 6.150 | 23.181 | 0.756 | 18.368 | 0.280 | 0.889 |
| FILE | | | | | | |
| Scan & Write (sec) | 18.533 | 69.032 | 0.997 | 45.243 | 0.803 | 4.896 |
| Rcp (sec) | 15.4 | 20.3 | 11.9 | 39.1 | 10.6 | 11.5 |
| Read & Restore (sec) | 8.693 | 17.602 | 0.124 | 3.654 | 0.303 | 1.234 |
| Migrate (sec) | 42.626 | 106.934 | 13.220 | 87.998 | 11.707 | 17.631 |
| COMPARISON | | | | | | |
| Diff (sec) | 36.48 | 83.75 | 12.46 | 69.63 | 11.43 | 16.74 |
| Speed Up (File/Network) | 6.93 | 4.61 | 17.48 | 4.79 | 41.72 | 19.82 |

For correctness, we found that the outputs of the implementation with migration and the implementation without migration were identical, for each testing input and testing program used. Because of the diversity of the test programs used, the process migration approach was shown to be feasible for any migration-safe code.

Apparently, direct network process migration is faster than migration through file systems, as shown by the difference in migration time (Diff) in Table 2. Network process performance improvement of process migration. As shown in Table 2, the time differences between process migration through file systems and direct network transmission of the test_pointer process with a data transmission size of 3,242,480 bytes and the Linpack process with data transmission size of 8,021,232 bytes were 83.75 and 69.63 seconds, respectively. Although the improvement ratios of these two applications were low, the performance differences (Diff)

were larger than those of the processes with smaller data transmission sizes.

In direct network process migration, according to our experimental results, the memory scan and restoration times of the pointer-intensive program tended to be higher than those of the program with array data structure, and this factor dominated the total process migration cost. Note that, in our comparison, the pointer-intensive and array-based programs had comparable data transmission sizes.

Comparing the timing results of the bitonic sort program, with the data transmission size of 182,248 bytes, and the linpack program with the data transmission size of 325,232 bytes shows the transmission size of the bitonic sort program was smaller, but its memory scan time and restoration time were higher. The same behavior was observed for the timing results of the test_pointer program, with data transmission size of 3,242,480 bytes, compared to the linpack program, with a data transmission size of 8,021,232 bytes.

During the scanning operation the MSRM routines searched every memory block, making the cost of scanning operations high for pointer-intensive programs. Also, during restoration many memory allocation operations were used to recreate the data structures. The searching and dynamic allocation costs depended mostly on the number of memory blocks and the number of pointers among them. On the other hand, the linpack program only needed a trivial amount of time to search for memory blocks during the memory scanning operations, since most data were stored in local or global variables. At the receiving end of the migration, the migration information was copied into the reserved memory space of the new process. Dynamic memory allocation was unnecessary for the restoration process of the linpack program.

The migration time of the pointer-intensive program was also higher than that of the array-based program for migration through file systems. From Table 2, the data transmission size indicated the size of the file that contains migration information. The relation between the complex data structure and the cost of process migration for file system-based migrations can be explained similarly to that of network-based migration.

Those of skill in the art will recognize that the novel methods are implemented by being programmed onto a digital computer; and that the programs may be stored in any short-term or long-term memory storage device, e.g. magnetic tape, floppy disks, hard disks, CD, DVD, RAM, and the like. The novel methods may be used both at runtime or upon retrieval from pre-stored information.

The complete disclosures of all references cited in this specification are hereby incorporated by reference, as is the entire disclosure of the following reference (which is not prior art to this application): K. Chanchio and X.-H. Sun, "Data collection and restoration for heterogeneous network process migration," Tech. Rep. 97-017, Louisiana State University, Department of Computer Science, September 1997. In the event of an otherwise irreconcilable conflict, however, the present specification shall control.

We claim:

1. A method for collecting data associated with a process having logical parameters and indirect memory references, wherein the process is in execution on a first digital computer having physical memory locations wherein the data are stored, and transforming the collected data into a machine-independent format adapted for transfer to a second digital computer which will continue execution of the process from the point at which data is collected from the first computer, wherein the first and second computers may have the same software environment or may have different software environments, and wherein the first and second computers may have identical hardware or may have different hardware; said method comprising the steps of:

(a) generating a memory representation data structure correlating logical parameters of the process in execution on the first computer to physical memory locations in the first computer, and correlating indirect memory references in the process to machine-independent representations of the indirect memory references;

(b) generating a type information table correlating data types associated with logical parameters of the process to physical memory locations in the first computer;

(c) searching the physical memory locations in the first computer, in accordance with the correlations in the memory representation data structure, and identifying which logical parameters will be needed to continue execution of the process on the second computer, based on the indirect memory references to logical parameters that could be used in the continued execution of the process on the second computer; and (d) saving the values and types of the identified logical parameters of the process in a machine-independent format, based on the data in the physical memory locations of the first computer and the correlations represented by the type information table; and saving the correlations of the memory representation data structure associated with the identified logical parameters in machine-independent format; and saving the correlations of the indirect memory references associated with the identified logical parameters in machine-independent format.

2. A method as recited in claim 1, wherein said saving step comprises saving the value of each of the identified logical parameters only once.

3. A method as recited in claim 1, wherein said process is compiled from source code in a stack-based language.

4. A method as recited in claim 3, wherein said stack-based language comprises a language selected from the group consisting of C, C++, Pascal, Ada, and Fortran.

5. A method as recited in claim 1, wherein said saving step consists of saving the values, types, and correlations only of the identified logical parameters of the process.

6. A method for restoring on a second computer data previously collected from a first computer in accordance with the method of claim 1; said method comprising the steps of:

(a) reconstructing a memory representation data structure correlating logical parameters of the process to be executed on the second computer to physical memory locations in the second computer, and correlating the machine-independent indirect memory references to indirect memory references on the second computer;

(b) reconstructing the type information table correlating data types associated with logical parameters of the process to physical memory locations in the second computer;

(c) identifying the physical memory locations in the second computer in which to restore the values and types of the logical parameters needed to continue execution of the process on the second computer, in accordance with the correlations of the reconstructed memory representation data structure; and (d) restoring data in the identified physical memory locations of the second computer based on the values and types of the identified logical parameters of the process in a machine-independent format and the correlations represented by the type information table.

7. A method as recited in claim 6, wherein said restoring step comprises restoring the value of each of the identified logical parameters only once.

8. A method as recited in claim 6, wherein said process is compiled from source code in a stack-based language.

9. A method as recited in claim 8, wherein said stack-based language comprises a language selected from the group consisting of C, C++, Pascal, Ada, and Fortran.

10. A method as recited in claim 1, wherein said saving step consists of saving the values, types, and correlations only of the identified logical parameters of the process.

11. A first digital computer programmed to collect data associated with a process having logical parameters and indirect memory references, wherein the process is in execution on a first digital computer having physical memory locations wherein the data are stored, and transform the collected data into a machine-independent format adapted for transfer to a second digital computer which will continue execution of the process from the point at which data is collected from the first computer, wherein the first and second computers may have the same software environment or may have different software environments, and wherein the first and second computers may have identical hardware or may have different hardware; wherein said computer is programmed to perform the steps of:

(a) generating a memory representation data structure correlating logical parameters of the process in execution on the first computer to physical memory locations in the first computer, and correlating indirect memory references in the process to machine-independent representations of the indirect memory references;

(b) generating a type information table correlating data types associated with logical parameters of the process to physical memory locations in the first computer;

(c) searching the physical memory locations in the first computer, in accordance with the correlations in the memory representation data structure, and identifying which logical parameters will be needed to continue execution of the process on the second computer, based on the indirect memory references to logical parameters that could be used in the continued execution of the process on the second computer; and (d) saving the values and types of the identified logical parameters of the process in a machine-independent format, based on the data in the physical memory locations of the first computer and the correlations represented by the type information table; and saving the correlations of the memory representation data structure associated with the identified logical parameters in machine-independent format; and saving the correlations of the indirect memory references associated with the identified logical parameters in machine-independent format.

12. A second digital computer programmed to restore data previously collected from a first computer in accordance with the method of claim 1; wherein said computer is programmed to perform the steps of:

(a) reconstructing a memory representation data structure correlating logical parameters of the process to be executed on the second computer to physical memory locations in the second computer, and correlating the machine-independent indirect memory references to indirect memory references on the second computer;

(b) reconstructing the type information table correlating data types associated with logical parameters of the process to physical memory locations in the second computer;

(c) identifying the physical memory locations in the second computer in which to restore the values and types of the logical parameters needed to continue execution of the process on the second computer, in accordance with the correlations of the reconstructed memory representation data structure; and (d) restoring data in the identified physical memory locations of the second computer based on the values and types of the identified logical parameters of the process in a machine-independent format and the correlations represented by the type information table.

13. A memory storage device containing a program for collecting data associated with a process having logical parameters and indirect memory references, wherein the process is in execution on a first digital computer having physical memory locations wherein the data are stored, and transforming the collected data into a machine-independent format adapted for transfer to a second digital computer which will continue execution of the process from the point at which data is collected from the first computer, wherein the first and second computers may have the same software environment or may have different software environments, and wherein the first and second computers may have identical hardware or may have different hardware; wherein said program is adapted to perform the following steps on the first digital computer:

(a) generating a memory representation data structure correlating logical parameters of the process in execution on the first computer to physical memory locations in the first computer, and correlating indirect memory references in the process to machine-independent representations of the indirect memory references;

(b) generating a type information table correlating data types associated with logical parameters of the process to physical memory locations in the first computer;

(c) searching the physical memory locations in the first computer, in accordance with the correlations in the memory representation data structure, and identifying which logical parameters will be needed to continue execution of the process on the second computer, based on the indirect memory references to logical parameters that could be used in the continued execution of the process on the second computer; and (d) saving the values and types of the identified logical parameters of the process in a machine-independent format, based on the data in the physical memory locations of the first computer and the correlations represented by the type information table; and saving the correlations of the memory representation data structure associated with the identified logical parameters in machine-independent format; and saving the correlations of the indirect memory references associated with the identified logical parameters in machine-independent format.

14. A memory storage device containing a program to restore data previously collected from a first computer in accordance with the method of claim 1; wherein said program is adapted to perform the following steps on the first digital computer:

(a) reconstructing a memory representation data structure correlating logical parameters of the process to be executed on the second computer to physical memory locations in the second computer, and correlating the machine-independent indirect memory references to indirect memory references on the second computer;

(b) reconstructing the type information table correlating data types associated with logical parameters of the process to physical memory locations in the second computer;

(c) identifying the physical memory locations in the second computer in which to restore the values and types of the logical parameters needed to continue execution of the process on the second computer, in accordance with the correlations of the reconstructed memory representation data structure; and (d) restoring data in the identified physical memory locations of the second computer based on the values and types of the identified logical parameters of the process in a machine-independent format and the correlations represented by the type information table.

* * * * *